(12) United States Patent
Marois

(10) Patent No.: US 9,908,202 B2
(45) Date of Patent: *Mar. 6, 2018

(54) CLAD SHEET ALLOYS FOR BRAZING APPLICATIONS

(71) Applicant: NOVELIS INC., Atlanta, GA (US)

(72) Inventor: Pierre Henri Marois, Kingston (CA)

(73) Assignee: Novelis Inc., Atlanta, GA (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/211,612

(22) Filed: Mar. 14, 2014

(65) Prior Publication Data

US 2014/0272462 A1 Sep. 18, 2014

Related U.S. Application Data

(60) Provisional application No. 61/789,215, filed on Mar. 15, 2013.

(51) Int. Cl.

| | |
|---|---|
| *B23K 35/02* | (2006.01) |
| *B23K 1/00* | (2006.01) |
| *B23K 35/28* | (2006.01) |
| *C22C 21/02* | (2006.01) |
| *F28F 21/08* | (2006.01) |
| *B23K 1/19* | (2006.01) |
| *B23K 103/10* | (2006.01) |

(52) U.S. Cl.
CPC ........ *B23K 35/0233* (2013.01); *B23K 1/0012* (2013.01); *B23K 1/19* (2013.01); *B23K 35/0238* (2013.01); *B23K 35/28* (2013.01); *B23K 35/286* (2013.01); *B23K 35/288* (2013.01); *C22C 21/02* (2013.01); *F28F 21/084* (2013.01); *F28F 21/089* (2013.01); *B23K 2203/10* (2013.01); *F28F 2275/04* (2013.01); *Y10T 428/12764* (2015.01)

(58) Field of Classification Search
None
See application file for complete search history.

(56) References Cited

U.S. PATENT DOCUMENTS

| | | | | |
|---|---|---|---|---|
| 3,843,333 | A * | 10/1974 | Woods ..................... | B23K 1/19 428/553 |
| 3,970,327 | A | 7/1976 | Dezelan | |
| 4,649,087 | A | 3/1987 | Scott et al. | |
| 5,037,707 | A | 8/1991 | Fortin et al. | |
| 5,041,343 | A | 8/1991 | Fortin et al. | |
| 5,356,725 | A | 10/1994 | Eichhorn et al. | |
| 6,361,882 | B1 * | 3/2002 | Shoji ..................... | B23K 1/0012 165/180 |
| 6,921,584 | B2 | 7/2005 | Syslak et al. | |
| 6,923,876 | B2 | 8/2005 | Kucza et al. | |
| 7,255,932 | B1 | 8/2007 | Kilmer | |
| 7,472,740 | B2 | 1/2009 | Anderson et al. | |
| 8,349,470 | B2 | 1/2013 | Marois et al. | |
| 2001/0007720 | A1 * | 7/2001 | Soga ..................... | B23K 35/288 428/654 |
| 2008/0003451 | A1 | 1/2008 | Suzuki | |
| 2010/0183897 | A1 | 7/2010 | Kobayashi et al. | |
| 2010/0266871 | A1 | 10/2010 | Matsuo et al. | |
| 2011/0204124 | A1 | 8/2011 | Witterbrood | |

FOREIGN PATENT DOCUMENTS

| | | |
|---|---|---|
| GB | 2390099 A | 12/2003 |
| JP | 01099794 | 4/1989 |
| JP | 9047892 A | 2/1997 |
| JP | 09302432 A | 11/1997 |
| JP | 2000297339 | 10/2000 |
| JP | 2010221301 | 10/2010 |
| JP | 2012513539 | 6/2012 |
| WO | 2014/143800 A1 | 11/1997 |
| WO | 2003054242 A1 | 7/2003 |
| WO | 2010052231 A1 | 5/2010 |
| WO | 2013068539 A1 | 5/2013 |

OTHER PUBLICATIONS

Aluminum Alloys—Effects of Alloying Elements, http://www.totalmateria.com/Article55.htm, dated Mar. 30, 2017.*
Zhu et al., Influences of nickel and Vanadium Impurities on Microstructure of Aluminum Alloys, Feb. 21, 2013, JOM vol. 65, No. 5, pp. 584-592.*
English translation of JP H09-302432 (Okada et al.) dated Aug. 23, 2017.*
International Application No. PCT/US2014/027921, International Search Report and Written Opinion dated Jul. 30, 2014, 14 pages.
Unpublished U.S. Appl. No. 14/211,760, filed Mar. 14, 2014.
EP Application No. 14716498.2, Communication pursuant to Article 94(3) EPC, dated Nov. 11, 2016, 8 pages.
Japanese Application No. JP2016502663, Office Action, dated Feb. 21, 2017, 4 pages.
U.S. Appl. No. 14/211,760 ,Non-Final Office Action, dated Sep. 21, 2016, 14 pages.
Japanese Application No. JP2016502663, Office Action, dated Sep. 27, 2016, 9 pages.
Canadian Application No. 2,901,347, Office Action, dated Aug. 29, 2016, 4 pages.
Korean Patent Application No. 10-2015-7029598, Notice of Preliminary Rejection dated Feb. 27, 2017, 6 pages (English Translation).

(Continued)

*Primary Examiner* — Adam Krupicka
(74) *Attorney, Agent, or Firm* — Kilpatrick Townsend & Stockton LLP

(57) ABSTRACT

This application discloses a multilayer aluminum material comprising an aluminum alloy core and aluminum alloy cladding, wherein the aluminum alloy cladding contains 0.1-1.0 wt % Cu, 0.1-0.5 wt % Fe, 0.1-1.0 wt % Mn, 3-15 wt % Si, 0.005-0.15 wt % Ti and >3-≤7 wt % Zn, remainder Al. The aluminum alloy cladding can also optionally contain one or more of 0.001-0.3 wt % Mg, 0.001-0.01 wt % Ni or 0.001-0.05 wt % of at least one of Sr, Ca or Na. A process for producing the material is also described. The material can be produced in sheet form and is suitable for brazing application. The metal forms fabricated from the multilayer aluminum material by a process comprising brazing steps are also described.

21 Claims, 10 Drawing Sheets

(56) References Cited

OTHER PUBLICATIONS

U.S. Appl. No. 14/211,760, Final Office Action dated Apr. 20, 2017, 14 pages.
U.S. Appl. No. 14/211,760, Non-Final Office Action dated Jun. 28, 2017, 16 pages.
European Patent Application No. EP 14716498.2, Office Action dated Jun. 20, 2017, 6 pages.
Japanese Patent Application No. JP 2016-502663, Pre-Appeal Examination Report dated Jul. 11, 2017, 2 pages.
Korean Patent Application No. 10-2015-7029598, Notice of Preliminary Rejection dated Aug. 10, 2017, 14 pages.

* cited by examiner

A.

B.

A.  B.

A.  B.

A                                    B

CLAD SHEET ALLOYS FOR BRAZING APPLICATIONS

RELATED APPLICATIONS

The present application claims the benefit of U.S. Provisional Application Ser. No. 61/789,215, filed Mar. 15, 2013, which is incorporated herein by reference in its entirety.

FIELD OF THE INVENTION

The present invention relates to the fields of material science, material chemistry, metallurgy, aluminum alloys, aluminum fabrication, and related fields.

BACKGROUND

Clad sheet alloys suitable for brazing applications comprise cladding alloys typically produced from commercial purity smelter aluminum, to which Si is added. Such conventional cladding aluminum alloys contain between 7 and 12% Si, <0.25% Fe and trace levels of other elements. Commercial purity smelter aluminum is more expensive than secondary or recycled aluminum. It is desirable to decrease the costs of the clad sheet aluminum alloys suitable for brazing applications by increasing the content of recycled aluminum alloys in such clad sheet alloys. It is also desirable to improve the properties of the aluminum alloys suitable for brazing applications, for example, in order to increase corrosion resistance and/or strength of the brazing joints produced by brazing parts or objects fabricated from clad sheet aluminum alloys.

SUMMARY

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below. Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Aluminum alloys traditionally used for casting, rather than cladding, contain much higher levels of one or more of Fe, Cu, Mg, Mn, Ni, Si, Ti or Zn than traditional cladding alloys. The inventor discovered that such "casting alloys" can be used as cladding alloys in cast aluminum alloys suitable for brazing applications. The present invention provides a multilayer aluminum material comprising an aluminum alloy core and aluminum alloy cladding. This material, referred to as "clad aluminum alloy," can be produced in sheet form and used for brazing applications. The present invention also provides processes for fabricating the above aluminum materials, as well as the processes for fabricating metal forms and/or objects fabricated from the above aluminum materials. Also provided are processes for using the above multilayer aluminum materials, comprising joining by brazing metal forms or objects, at least one of which is fabricated from the multilayer aluminum material. Brazing, as incorporated into the embodiments of the present invention, includes, but is not limited to, vacuum brazing, controlled atmosphere brazing, Borg-Warner Ni plating process or molten salt brazing.

One exemplary embodiment of the present invention is an aluminum material comprising an aluminum alloy core and an aluminum alloy cladding, wherein the cladding comprises an aluminum alloy comprising ≤1.0 wt % Cu, ≤0.5 wt % Fe, ≤1.5 wt % Mg, ≤1.0 wt % Mn, ≤0.01 wt % Ni, ≤15 wt % Si, ≤0.15 wt % Ti, ≤7 wt % Zn and ≤0.05 wt % Sr, remainder Al. It is to be understood that in the various embodiments of the alloys described herein that the predominant element is aluminum (Al), sometimes called remainder Al. It is also to be understood that the various embodiments of the alloys described herein can comprise various unavoidable impurities not otherwise specified. In some non-limiting examples a content of each impurity can constitute up to 0.05 wt %. In some other non-limiting examples, a total content of impurities can constitute up to 0.15 wt %. In one embodiment, the aluminum alloy cladding comprises 0.1-1.0 wt % Cu, 0.1-0.5 wt % Fe, 0.1-1.0 wt % Mn, 3-15 wt % Si, 0.005-0.15 wt % Ti and 0.1-7 wt % Zn, remainder Al. In another embodiment the aluminum alloy cladding comprises 0.15-0.6 wt % Cu, 0.1-0.4 wt % Fe, 0.2-0.7 wt % Mn, 5-12 wt % Si, 0.01-0.15 wt % Ti and 0.5-5 wt % Zn, remainder Al. In yet another embodiment, the aluminum alloy cladding comprises 0.15-0.3 wt % Cu, 0.2-0.4 wt % Fe, 0.3-0.5 wt % Mn, 7-10 wt % Si, 0.005-0.13 wt % Ti and 0.5-3.5 wt % Zn, remainder Al. In any of the above embodiments, the aluminum alloy cladding may further optionally comprise one or more of 0.001-0.3 wt % Mg, 0.001-0.01 wt % Ni or 0.001-0.05 wt % Sr, Na or Ca.

The material can be in a form of a sheet, comprising the cladding on one side of the sheet or on both sides of the sheet. Another exemplary embodiment of the present invention is a process for preparing an aluminum material comprising an aluminum alloy core and an aluminum alloy cladding, comprising: casting the cladding alloy; rolling the cladding alloy to a required thickness, thus producing the rolled cladding alloy; assembling the rolled cladding alloy onto at least one side of a rolled core alloy; and hot roll bonding the rolled cladding alloy onto the rolled core alloy. Variations of the above processes can comprise fusion casting by the FUSION™ (Novelis, Atlanta, USA) process of the aluminum alloy core and the aluminum alloy cladding. The above processes can comprise, prior to casting, preparing the cladding alloy from scrap aluminum with addition of Si or from a combination of scrap aluminum and smelter grade aluminum. More generally, cladding aluminum alloy can contain recycled aluminum scrap metal.

Another exemplary embodiment of the present invention is a process comprising joining by brazing at least one aluminum alloy form fabricated from a material according to the embodiments of the present invention with a second aluminum alloy form. Objects fabricated by a process comprising joining by brazing are also included within the scope of the embodiments of the present invention. Examples of such objects are a heater core, an evaporator, a radiator, a condenser, a tube, a pipe or a manifold.

DETAILED DESCRIPTION

Figure 1:
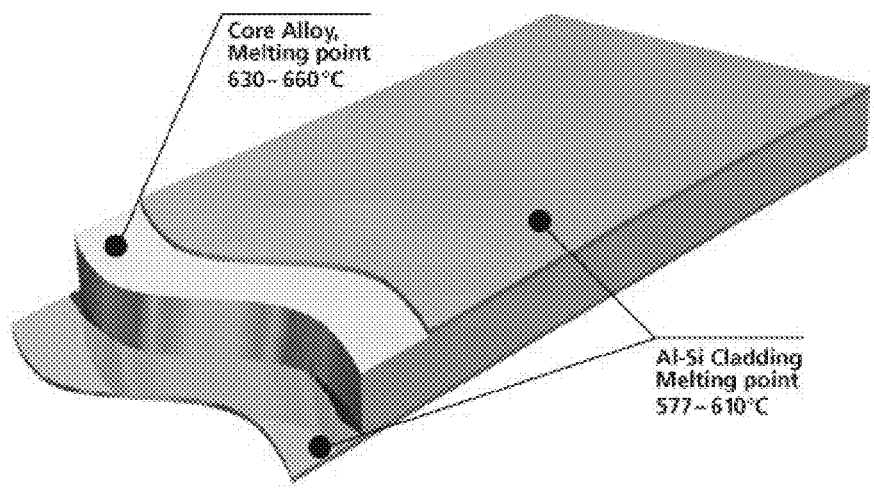
FIG. 1 is a drawing schematically illustrating a clad-sheet aluminum alloy suitable for brazing.

In this description, reference is made to alloys identified by AA numbers and other related designations, such as "series." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Among other things, this document describes innovative multilayer aluminum materials comprising an aluminum alloy core and aluminum alloy cladding. These multilayer aluminum materials can be referred to as "clad aluminum alloys." The innovative multilayer aluminum materials described herein can be fabricated as sheets, with the cladding on one or both sides of the sheet, in which case they can be referred to as "clad sheet aluminum alloys," "clad aluminum sheets," "clad sheet alloys" or by other related terms, in singular or plural. The term "clad aluminum alloy" and similar terms used herein are broader in scope than the term "clad sheet aluminum alloy" and similar terms. In other words, clad sheet aluminum alloys are a subset of clad aluminum alloys.

Clad aluminum alloys, including clad sheet aluminum alloys, can possess various compositions and properties. Some of these properties may be conferred by the chemical composition of the core and cladding layers, while other properties may be conferred by the manufacturing or fabrication processes used in the production or fabrication of clad aluminum alloys.

Clad sheet aluminum alloys described herein are suitable for fabrication or manufacturing processes that require the joining of metal surfaces by brazing. Brazing is a metal joining process in which filler metal is heated above a melting point and distributed between two or more close-fitting parts by capillary action. In essence, when clad aluminum alloys described herein are used in a brazing process, the cladding melts and becomes the filler metal that is available to flow by capillary action to points of contact between the components being brazed. It is to be understood that it is not necessary for both or all parts being joined for brazing to be made of a clad sheet alloy. At least in some cases, it is sufficient for only one part of those parts being joined to be made of a clad sheet alloy. For example, a clad tube stock can be joined to a non-clad fin alloy in a radiator or an evaporator. In another example, a clad fin can be joined to a non-clad extrusion tube in a condenser. The uses of the clad sheet aluminum alloys in brazing and the related processes and results, such as the objects fabricated according to the manufacturing process that involve brazing, are generally referred to as "brazing applications."

The present invention unexpectedly revealed that certain alloys traditionally used for casting, rather than cladding, can be used as cladding alloys in clad aluminum alloys suitable for brazing applications. These traditional "casting alloys" contain much higher levels of one or more of Fe, Cu, Mg, Mn, Ni, Si, Ti, or Zn than cladding alloys conventionally used in brazing applications. Use of these traditional "casting alloys" as cladding alloys in clad aluminum alloys for brazing applications results in a number of advantages discussed in more detail further in this document. The present invention is embodied in the innovative clad aluminum alloys described herein, including clad sheet aluminum alloys, and in the processes related to the manufacturing and use of these innovative clad aluminum alloys. Some of the embodiments of the present invention are processes for fabricating or manufacturing of the innovative clad aluminum alloys. Some other embodiments of the present invention are processes for using clad aluminum alloys, which involve brazing. The present invention includes forms or objects that have brazed joints produced using the innovative clad aluminum alloys described herein.

Clad Aluminum Alloys

The innovative clad aluminum alloys according to the embodiments of the present invention differ from the conventional clad aluminum alloys suitable for brazing applications in that the innovative clad aluminum alloys contain at least one cladding layer of an aluminum alloy that contains higher levels of one or more of Fe, Cu, Mg, Mn, Ni, Si, Ti, or Zn than cladding alloys conventionally used in brazing applications. The innovative clad aluminum alloys described herein can be fabricated as clad sheet alloys that comprise core and cladding on one or both sides of the sheet.

The terms "cladding," "clad," "cladding layer," and the related terms are used generally to refer to a relatively thin surface layer of a multilayer aluminum alloy. The terms "core," "core layer" and the related terms are used to refer to a relatively thicker layer of a multilayer aluminum alloy. A clad sheet aluminum alloy can have cladding layers on both sides of the sheet, in which case a core layer is indeed an internal layer of the multilayer material. However, a clad sheet alloy can also have cladding on only one side of the sheet, in which case the core layer can also be on a surface. The core layer and cladding layer or layers typically have different chemical compositions. A clad sheet alloy can have two different cladding layers with different compositions and properties.

Figure 11:
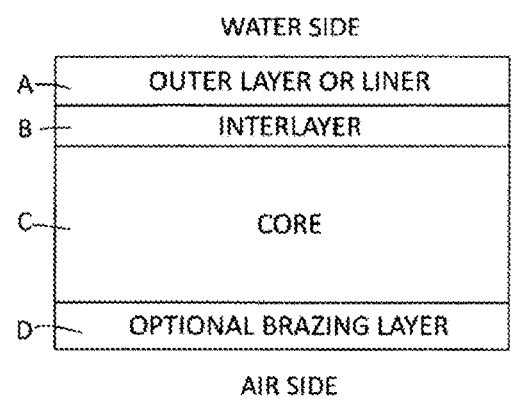
FIG. 11 shows, in panel A, a schematic image of a cross-section of an exemplary multilayer aluminum sheet, and, in panel B, a schematic image of a cross-section of a tube formed from a sheet of the kind shown in panel A.
Figure 11:
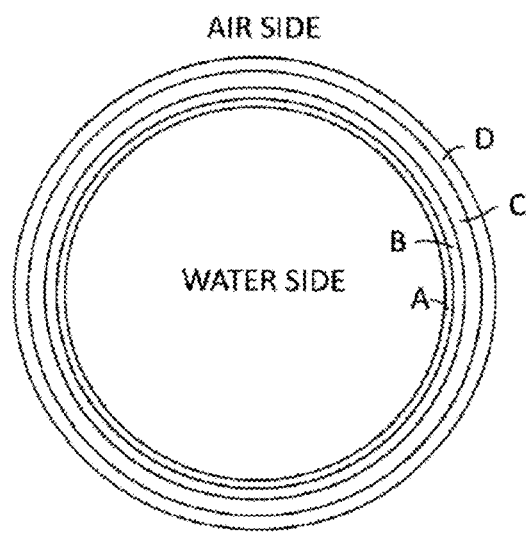

It is to be understood that clad aluminum alloys suitable for brazing applications do not necessarily contain only a core layer and one or two cladding layers. Clad aluminum alloys can contain other layers, some of which may be referred to as "interlayers," "outer layers," "liners" and by other related terms. This concept is illustrated in some examples discussed and shown elsewhere in this document. Some examples of clad aluminum alloys are illustrated in FIGS. 1 and 11. Clad sheet aluminum alloys can have 2, 3, 4, 5, 6 or more distinct layers, each having a certain function. More generally, a clad sheet aluminum alloy can have as many layers as can be stacked and bonded together in one or more operations. In the commercial context, one possible limiting factor is the cost of production and/or scrap generated during production of multilayer alloys, which can become too high with the increased number of layers for the multilayer alloy to be commercially viable. In the context of clad sheet aluminum alloys suitable for brazing applications, one or more of the cladding layers are the portion of the sheet that melt during a braze cycle. A liner can be a layer that is not expected to melt during a braze cycle and may confer some other benefits, such as corrosion resistance or increased strength, onto the multilayer aluminum alloy. A core can also include multiple layers, such as one or more interlayers on one or both side of the main core layer.

The composition of the cladding suitable for brazing applications, which can be termed "brazing aluminum alloy," "brazing cladding alloy," "cladding alloy for brazing" and other related terms is illustrated in Table 1 (a, b, c). The content of the elements listed in Table 1 can fall within the ranges delimited by a lower range limit and an upper range limit shown in Table 1. A lower range limit can be delineated by expressions "equal to or more than" (≥ sign) or "more than" (> sign), or other related signs and expression, such as "from . . . ," "higher than" etc. An upper range limits can be delineated by expressions "equal to or less than" (≤ sign), "less than" (< sign) or other related signs and expressions, such as "to," "less than," etc. Other types of expressions can also be used to delineate the ranges, such as "between," "in the range of," etc. When a range is delineated by only the upper range limit, it is to be understood that, in some examples falling within such a range, an element in question may not be present, may not be present in detectable quantities, or may be present in such low quantities that they are conventionally not recognized as meaningful in the field of aluminum alloys. It is to be understood that the term "remainder" can be used to describe aluminum (Al) content in the aluminum alloys described herein. It is also to be understood that some other additives and/or elements can be present in the aluminum alloy, which are not necessarily listed in Table 1. Generally, aluminum alloys and related terms and nomenclature are documented in a document published by The Aluminum Association, namely, "Registration Record of Aluminum Association Alloy Designations and Chemical Compositions in the Form of Castings and Ingot".

The presence and the content of one or more elements included in Table 1, as well as some other elements not necessarily listed in Table 1, can affect properties of the aluminum alloy cladding according to the general principles known in the field of metallurgy and briefly summarized below. It is therefore possible to change the properties of the cladding layer and the clad aluminum alloy that incorporates the cladding layer by varying the presence and the content of one or more of the elements, some of which are discussed below.

Cu: Cu in solid solution increases strength of an aluminum alloy. Depending on concentration, Cu can have an effect on corrosion resistance of an aluminum alloy. For example, in the clad aluminum alloys according to some embodiments of the present invention, Cu in solid solution can increase the corrosion resistance by lowering the spread between the corrosion potential (ASTM G69 SCE) of the matrix and the Si particles in the eutectic system. The cladding layer of the clad aluminum alloys according to the embodiments of the present invention can comprise, in some non-limiting examples, 0.1-0.3, 0.1-0.6, 0.1-1.0, 0.15-0.3, 0.15-0.6 0.15-0.1, 0.5-1.0, >0.5 but ≤1.0, 0.55-1.0 or 0.6-1.0 wt % Cu. Cu content in the cladding layer may be unspecified in some embodiments of the present invention, although it may still be present in the cladding layer.

Fe: Relatively small amounts of Fe may be present in solid solution in an aluminum alloy after processing. Fe can be a part of intermetallic constituents which may contain Mn, Si, and other elements. It is often beneficial to control Fe content in an aluminum alloy to avoid large constituents, which do not contribute to the beneficial properties of the alloy, such as fracture toughness. In conventional cladding alloys, Fe content is kept low to avoid formation of Beta AlFeSi which is in needle form. The aluminum alloys used for the cladding layer in the embodiments of the present invention can tolerate higher than conventionally acceptable levels of Fe. The cladding layer of the clad aluminum alloys according to the embodiments of the present invention can comprise in some non-limiting examples 0.1-0.4, 0.1-0.5, 0.2-0.4 or 0.2-0.5 wt % Fe. Fe content in the cladding layer may be unspecified in some embodiments of the present invention, although it may still be present in the cladding layer.

Mg: Mg is generally added for strength in aluminum alloys. In brazing applications, Mg can be added to improve vacuum brazing in that it helps to break up the surface oxide, so that filler metal can wet adjacent surfaces. It is, however, detrimental to Controlled Atmosphere Brazing (CAB), where Mg reacts with the flux to create solid needles of $K_2MgF_4$ and $MgF_2$ during the brazing cycle. Generally, inclusion of Mg is not a requirement for a cladding alloy according to the embodiments of the present invention, but the presence of Mg may be required, desired, or optional in some embodiments. That is, Mg may not necessarily be present (in other words, may or may not be present or may be optionally present) in the cladding layer of the clad aluminum alloys according to the embodiments of the present invention. Nevertheless, the cladding layer of the clad aluminum alloys according to the embodiments of the present invention can optionally comprise in some non-limiting examples 0.00-0.1, 0.00-0.2, 0.00-0.3, 0.00-0.5, 0.00-1.5, 0.001-0.1, 0.001-0.2, 0.001-0.3, 0.001-0.5, 0.001-1.5, 0.005-0.1, 0.005-0.2, 0.005-0.3, 0.005-0.5, 0.005-1.5, 0.005-0.1, 0.005-0.2, 0.005-0.3, 0.005-0.5, 0.005-1.5, 0.1-0.2, 0.1-0.3, 0.1-0.5, 0.1-1.5, 0.2-0.3, 0.2-0.5 or 0.2-1.5 wt % Mg. To be suitable for CAB brazing, cladding alloy typically needs to contain ≤0.2 wt % Mg, unless special fluxes are used to limit or eliminate the formation of the KMgF$_2$ needles. To be suitable for vacuum brazing, cladding alloy typically needs to contain from approximately 0.2 to 1.5 wt % Mg. To be suitable for Borg-Warner process, cladding alloy typically needs to contain up to approximately 0.5 wt % Mg. Mg content in the cladding layer may be unspecified in some embodiments of the present invention, although it may still be present in the cladding layer.

Mn: Mn in solid solution increases strength of an aluminum alloy and moves corrosion potential towards a more cathodic state. (FeMn)—Al$_6$ or Al$_{15}$Mn$_3$Si$_2$ dispersoid increases strength of an aluminum alloy by particle strengthening, when present in a fine and dense dispersion. Mn present in the cladding alloys used in the embodiments of the present invention may promote the formation of the Cubic Alpha AlFeMnSi phase, which is blocky or acicular in shape. Depending on the composition and solidification rate, Fe, Mn, Al and Si combine during solidification to form various intermetallic constituents, i.e. particles within the microstructure, like Al$_{15}$(Fe Mn)$_3$Si$_2$ or Al$_5$FeSi or Al$_8$FeMg$_3$Si$_6$, to name a few. The cladding layer of the clad aluminum alloys according to the embodiments of the present invention can comprise in some non-limiting examples 0.1-0.45, 0.1-0.50, 0.1-0.7, 0.1-1, 0.2-0.45, 0.2-0.5, 0.2-0.7, 0.2-1, 0.3-0.45, 0.3-0.5, 0.3-0.7, 0.3-1, >3 but ≤0.1, 0.35-0.45, 0.35-0.5, 0.35-0.7, 0.35-1, 0.4-0.45, 0.4-0.5, 0.4-0.7 or 0.4-1 wt % Mn. Mn content in the cladding layer may be unspecified in some embodiments of the present invention, although it may still be present in the cladding layer.

Ni: Ni forms NiAl$_3$, which is highly cathodic in aluminum alloys. In some embodiments of the present invention, it is therefore beneficial to have low Ni levels in the cladding alloy. Notwithstanding the composition limits shown in Table 1 (a, b, c), it is understood that Ni content can be higher in post braze materials produced through the Borg-Warner process or in applications that would not involve corrosive environments where the presence of NiAl$_3$ would be detrimental. Inclusion of Ni is not a requirement for a cladding alloy according to the embodiments of the present invention. That is, Ni may not be necessarily be present (in other words, may or may not be present or may be optionally present) in the cladding layer of the clad aluminum alloys according to the embodiments of the present invention. Nevertheless, the cladding layer of the clad aluminum alloys according to the embodiments of the present invention may optionally comprise in some non-limiting examples 0.00-0.01, 0.001-0.01, 0.005-0.01 wt % Ni. Ni content in the cladding layer may be unspecified in some embodiments of the present invention, although it may still be present in the cladding layer.

Figure 2:
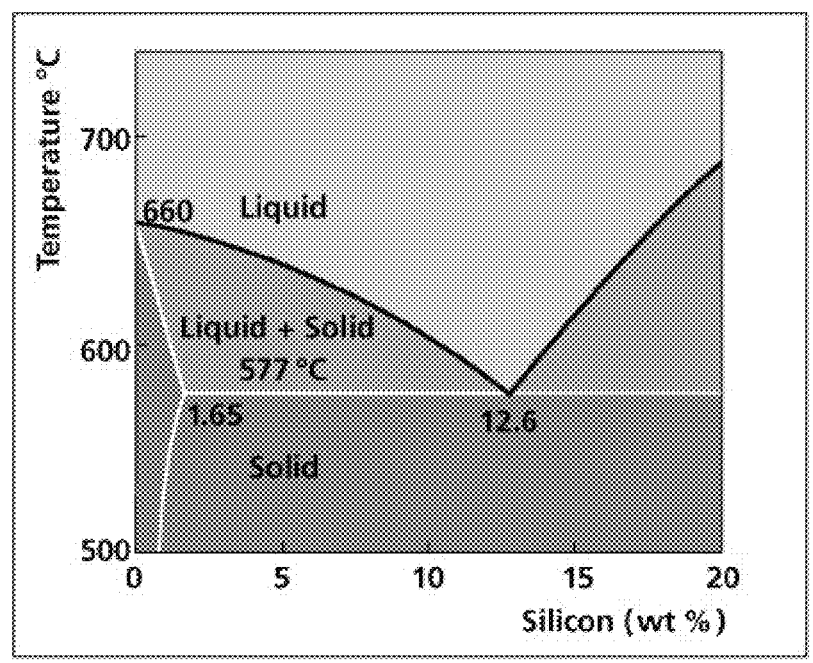
FIG. 2 is a scheme illustrating an aluminum silicon phase diagram.

Si: Si is used at different concentration to allow for a multitude of melting ranges necessary for different brazing applications, as illustrated by aluminum silicon phase diagram shown in FIG. 2. The cladding layer of the clad aluminum alloys according to the embodiments of the present invention can comprise in some non-limiting examples 3-8, 3-10, 3-12, 3-15, 5-7, 5-8, 5-10, 5-12, 5-15, 7-8, 7-10, 7-12, 7-15, 8-10, 8-12 or 8-15 wt % Si. Si content in the cladding layer may be unspecified in some embodiments of the present invention, although it may still be present in the cladding layer.

Ti: Ti can improve corrosion resistance when present in 0.1-0.22 wt % range in an aluminum alloy. As a peritectic element, Ti is concentrated in the center of the cells after alloy re-solidification. The cladding layer of the clad aluminum alloys according to the embodiments of the present invention can comprise in some non-limiting examples 0.005-0.13, 0.005-0.15, 0.01-0.13 or 0.01-0.15 wt % Ti. Ti content in the cladding layer may be unspecified in some embodiments of the present invention, although it may still be present in the cladding layer.

Figure 3:
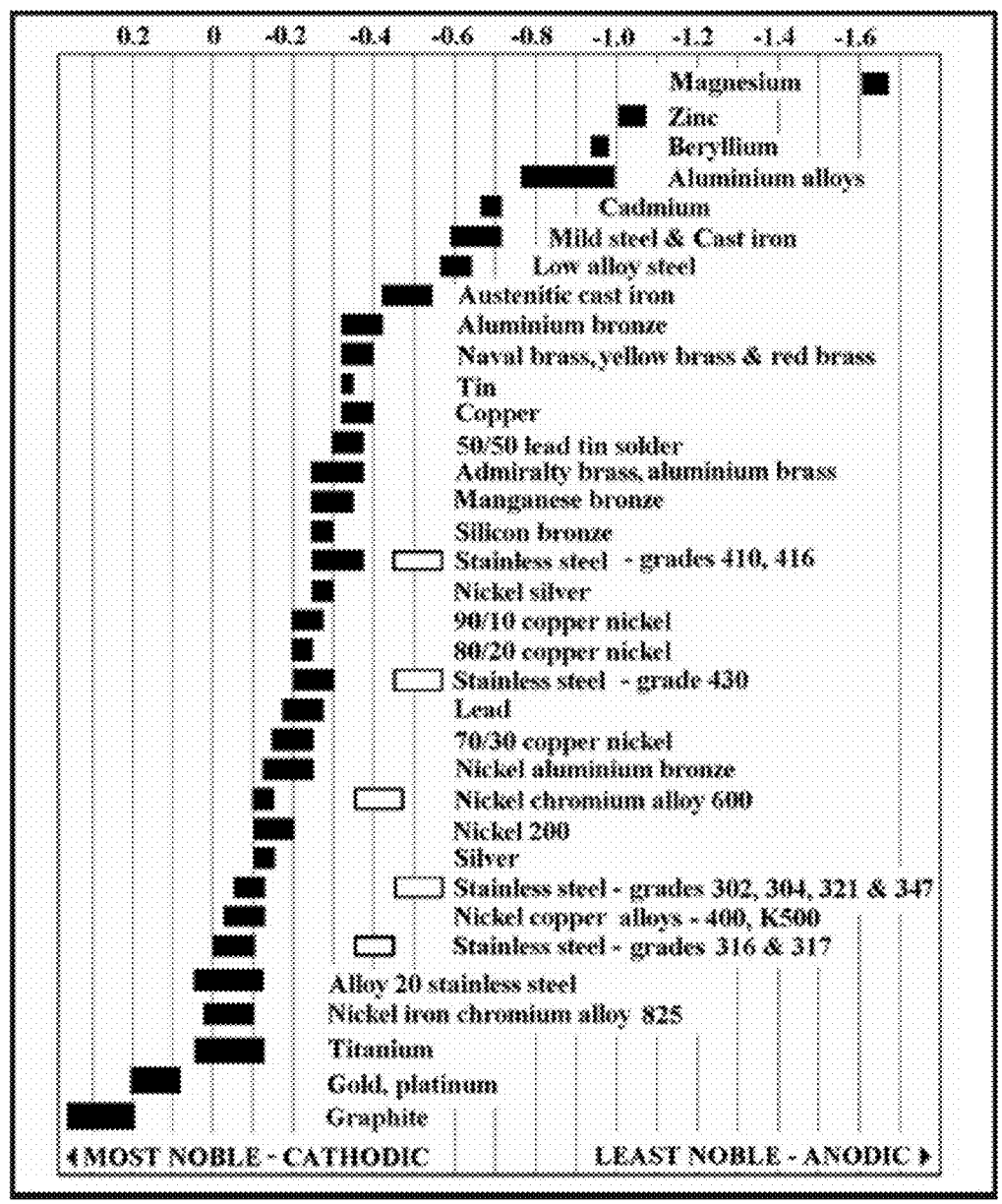
FIG. 3 is a reproduction of the electrochemical potential series.

Zn: Zn is typically added to aluminum alloys to move the corrosion potential towards the anodic end of the scale, as illustrated by Electrochemical Potential Series shown in FIG. 3. Zn can be a strengthening element, when elements such as Cu, Mg are present, such as in 7000 series alloys. For example, wrought Al 7000 contains between 3.0 to 9.7% Zn; 7000 series casting alloys contain between 2.7 and 8% Zn. The cladding layer of the clad aluminum alloys according to the embodiments of the present invention can comprise in some non-limiting examples 0.1-3.0, 0.1-3.25, 0.1-3.5, 0.1-5, 0.1-7.0, 0.5-3.0, 0.5-3.25, 0.5-3.5, 0.5-5, 0.5-7.0, 1.0-3.0, 1.0-3.25, 1.0-3.5, 1.0-7.0 or 1.0-5.0, >3 but ≤5, 3.25-5, 3.5-5, 3.75-5, 4-5, 4.25-5, 4.75-5, 1.0-7.0, >3 but ≤7, 3.25-7, 3.5-7, 3.75-7, 4-7, 4.25-7, 4.75-7, 5-7, 1.0-7.5, >3 but ≤7.5, 3.25-7.5, 3.5-7.5, 3.75-7.5, 4-7.5, 4.25-7.5, 4.75-7.5, 5-7.5, 1.0-8.0, >3 but ≤8, 3.25-8, 3.5-8, 3.75-8, 4-8, 4.25-8, 4.75-8 or 5-8 wt % Zn. Zn content in the cladding layer may be unspecified in some embodiments of the present invention, although it may still be present in the cladding layer.

Sr, Na, Ca: Sr, Na or Ca are generally added to AlSi alloys to modify the Si particles from needle-shaped to fine spherical. Sr and Na metals are most beneficial during direct chill casting, where solidification rates are relatively slow. Sr remains longer in the molten Al and thus allows for more time before casting takes place, while Na starts to evaporate faster from the molten metal so restricts the time before casting. Sr, Na or Ca are effective at modifying the Si in AlSi alloys. Generally, inclusion of Na, Ca or Sr is not a requirement for a cladding alloy according to the embodiments of the present invention, but the presence of at least one of Ca, Na or Sr may be required, desired, or optional in some embodiments. That is, Ca, Na and/or Sr may not be necessarily be present (in other words, may or may not be present or may be optionally present) in the cladding layer of the clad aluminum alloys according to the embodiments of the present invention. Nevertheless, the cladding layer of the clad aluminum alloys according to the embodiments of the present invention can optionally comprise in some non-limiting examples 0.000-0.002, 0.00-0.02, 0.00-0.025, 0.00-0.03, 0.00-0.05, 0.001-0.002, 0.001-0.025, 0.001-0.03, 0.001-0.05, 0.005-0.025, 0.005-0.03, 0.005-0.05 wt % Sr, Na or Ca. Sr, Na or Ca content can also be higher than specified in the above ranges. Sr, Na or Ca content in the cladding layer may be unspecified in some embodiment of the present invention, although it may still be present in the cladding layer.

Some of the elements listed in Table 1a are optionally present in the exemplary preferred embodiments of the cladding alloy for brazing according to the present invention. These elements and their exemplary content are listed in Table 1c. Some of the elements listed in Table 1a are necessarily present in exemplary preferred embodiments of the cladding alloy for brazing according to the present invention. These elements and their exemplary content are listed in Table 1b.

Some illustrative embodiments of the composition of the cladding layer ("aluminum alloy cladding") of the clad aluminum alloys are provided below. In the first embodiment, an aluminum alloy cladding contains 0.1-1.0 wt % Cu, 0.1-0.5 wt % Fe, 0.1-1.0 wt % Mn, 3-15 wt % Si, 0.005-0.15 wt % Ti and 0.1-7 wt % Zn. In the second embodiment, an aluminum alloy cladding contains 0.15-0.6 wt % Cu, 0.1-0.4 wt % Fe, 0.2-0.7 wt % Mn, 5-12 wt % Si, 0.005-0.13 wt % Ti and 0.5-5 wt % Zn. In the third embodiment, an aluminum alloy cladding contains 0.15-0.3 wt % Cu, 0.2-0.4 wt % Fe, 0.3-0.5 wt % Mn, 7-10 wt % Si, 0.01-0.15 wt % Ti and 0.5-3.5 wt % Zn. In the fourth embodiment, an aluminum alloy cladding contains 0.15-0.3 wt % Cu, 0.2-0.4 wt % Fe, 0.3-0.5 wt % Mn, 7-12 wt % Si, 0.01-0.15 wt % Ti and 0.5-3.5 wt % Zn.

In the fifth embodiment, an aluminum alloy cladding contains 0.1-1 wt % Cu, 0.2-0.4 wt % Fe, 0.3-0.5 wt % Mn, 7-12 wt % Si, 0.01-0.15 wt % Ti and >3 but ≤7 wt % Zn. In the sixth embodiment, an aluminum alloy cladding contains 0.1-1 wt % Cu, 0.2-0.4 wt % Fe, 0.3-0.5 wt % Mn, 7-12 wt % Si, 0.01-0.15 wt % Ti and 3.25-7 wt % Zn. In the seventh embodiment, an aluminum alloy cladding contains 0.55-1.0 wt % Cu, 0.2-0.4 wt % Fe, 0.3-0.5 wt % Mn, 7-12 wt % Si, 0.01-0.15 wt % Ti and >3 but ≤7 wt % Zn. In the eighth embodiment, an aluminum alloy cladding contains 0.55-1 wt % Cu, 0.2-0.4 wt % Fe, 0.3-0.5 wt % Mn, 7-12 wt % Si, 0.01-0.15 wt % Ti and 3.25-7 wt % Zn. In the ninth embodiment, an aluminum alloy cladding contains 0.55-1.0 wt % Cu, 0.2-0.4 wt % Fe, 0.35-0.5 wt % Mn, 7-12 wt % Si, 0.01-0.15 wt % Ti and >3 but ≤7 wt % Zn. In the tenth embodiment, an aluminum alloy cladding contains 0.55-1 wt % Cu, 0.2-0.4 wt % Fe, 0.35-0.5 wt % Mn, 7-12 wt % Si, 0.01-0.15 wt % Ti and 3.25-7 wt % Zn. In the eleventh embodiment, an aluminum alloy cladding contains 0.1-1.0 wt % Cu, 0.2-0.4 wt % Fe, 0.35-0.5 wt % Mn, 7-12 wt % Si, 0.01-0.15 wt % Ti and >3 but ≤7 wt % Zn. In the twelfth embodiment, an aluminum alloy cladding contains 0.1-1 wt % Cu, 0.2-0.4 wt % Fe, 0.35-0.5 wt % Mn, 7-12 wt % Si, 0.01-0.15 wt % Ti and 3.25-7 wt % Zn.

In the thirteenth embodiment, an aluminum alloy cladding contains 0.1-1 wt % Cu, 0.2-0.4 wt % Fe, 0.35-1 wt % Mn, 7-12 wt % Si, 0.01-0.15 wt % Ti and >3 but ≤7 wt % Zn. In the fourteenth embodiment, an aluminum alloy cladding contains 0.1-1 wt % Cu, 0.2-0.4 wt % Fe, 0.35-1 wt % Mn, 7-12 wt % Si, 0.01-0.15 wt % Ti and 3.25-7 wt % Zn. In the fifteenth embodiment, an aluminum alloy cladding contains 0.55-1.0 wt % Cu, 0.2-0.4 wt % Fe, 0.35-1 wt % Mn, 7-12 wt % Si, 0.01-0.15 wt % Ti and >3 but ≤7 wt % Zn. In the sixteenth embodiment, an aluminum alloy cladding contains 0.55-1 wt % Cu, 0.2-0.4 wt % Fe, 0.35-1 wt % Mn, 7-12 wt % Si, 0.01-0.15 wt % Ti and 3.25-7 wt % Zn. In the seventeenth embodiment, an aluminum alloy cladding contains 0.55-1.0 wt % Cu, 0.2-0.4 wt % Fe, 0.35-1 wt % Mn, 7-12 wt % Si, 0.01-0.15 wt % Ti and >3 but ≤7 wt % Zn. In the eighteenth embodiment, an aluminum alloy cladding contains 0.55-1 wt % Cu, 0.2-0.4 wt % Fe, 0.35-1 wt % Mn, 7-12 wt % Si, 0.01-0.15 wt % Ti and 3.25-7 wt % Zn. In the nineteenth embodiment, an aluminum alloy cladding contains 0.1-1.0 wt % Cu, 0.2-0.4 wt % Fe, 0.35-1 wt % Mn, 7-12 wt % Si, 0.01-0.15 wt % Ti and >3 but ≤7 wt % Zn. In the twentieth embodiment, an aluminum alloy cladding contains 0.1-1 wt % Cu, 0.2-0.4 wt % Fe, 0.35-1 wt % Mn, 7-12 wt % Si, 0.01-0.15 wt % Ti and 3.25-7 wt % Zn.

TABLE 1a

| | Composition of cladding alloy for brazing (element content in wt %) | | | | |
|---|---|---|---|---|---|
| | Examples of | Examples of | Range examples | | |
| Element | lower range limit | upper range limit | Range 1 | Range 2 | Range 3 |
| Cu | 0.05; 0.1; 0.15; 0.2 | 0.3; 0.35; 0.4; 0.45; 0.5; 0.55; 0.6; 0.65; 0.7; 0.75; 0.8; 0.85; 0.9; 0.95; 1.0 | ≤1.0 | ≤0.6 | 0.2-0.3 |
| Fe | 0.05; 0.1; 0.15; 0.2 | 0.3; 0.35; 0.4; 0.45; 0.5 | ≤0.5 | ≤0.3 | 0.2-0.3 |
| Mg | 0.00; 0.001; 0.005; 0.01 | 0.05; 0.1; 0.2; 0.3; 0.4; 0.5; 0.6; 0.7; 0.8; 0.9; 1.0; 1.1; 1.2; 1.3; 1.4; 1.5 | ≤0.1 | ≤0.5 | ≤1.5 |
| Mn | 0.1; 0.2; 0.3; 0.35; 0.4 | 0.4; 0.45; 0.5; 0.55; 0.6; 0.65; 0.7; 0.75; 0.8; 0.85; 0.9; 0.95; 1 | ≤1 | ≤0.75 | ≤0.6 |
| Ni | 0.00; 0.001; 0.005 | 0.005; 0.01 | ≤0.01 | 0.001-0.01 | ≤0.005 |
| Si | 3; 4; 5; 6; 7; 8 | 10; 11; 12; 13; 14; 15 | ≤15 | 3-12 | 7-12 |
| Ti | 0.005; 0.01; 0.02; 0.03; 0.04; 0.05; 0.1 | 0.1; 0.13; 0.14; 0.15 | ≤0.15 | 0.01-0.15 | 0.05-0.15 |
| Zn | 0.1; 0.5; 1; 1.5; 2; 2.5; 3; 3.25; 3.5; 3.75; 4; 4.25; 4.5; 5 | 3; 3.5; 4; 4.5; 5; 5.5; 6; 6.5; 7; 7.5; 8 | ≤7 | ≤5 | ≤3.5 |
| Sr | 0.00; 0.001; 0.005; 0.01 | 0.001, 0.002, 0.025; 0.03; 0.035; 0.04; 0.045; 0.05 | ≤0.05 | ≤0.03 | 0.01-0.025 |
| Na | 0.00; 0.001; 0.005; 0.01 | 0.001, 0.002, 0.025; 0.03; 0.035; 0.04; 0.045; 0.05 | ≤0.05 | ≤0.03 | 0.01-0.025 |
| Ca | 0.001; 0.005; 0.01 | 0.025; 0.03; 0.035; 0.04; 0.045; 0.05 | ≤0.05 | ≤0.03 | 0.01-0.025 |

TABLE 1b

Examples of the content of the elements present in the cladding alloy for brazing (element content in wt %)

| | Range examples | | | | |
|---|---|---|---|---|---|
| Element | Range 1 | Range 2 | Range 3 | Range 4 | Range 5 |
| Cu | 0.1-1.0 | 0.15-0.6 | 0.15-0.3 | 0.55-1.0 | |
| Fe | 0.1-0.5 | 0.1-0.4 | 0.2-0.4 | | |
| Mn | 0.1-1 | 0.2-0.7 | 0.3-0.5 | 0.3-0.45 | 0.35-1 |
| Si | 3-15 | 5-12 | 7-10 | 7-12 | 8-12 |
| Ti | 0.005-0.15 | 0.005-0.13 | 0.01-0.15 | | |
| Zn | 0.1-7.0 | 0.5-5.0 | 0.5-3.5 | >3 but ≤7 | 3.25-7 |

TABLE 1c

Examples of the content of the elements optionally present in the cladding alloy for brazing (element content in wt %)

| | Range examples | | | | |
|---|---|---|---|---|---|
| Element | Range 1 | Range 2 | Range 3 | Range 4 | Range 5 |
| Mg | 0.001-0.3 | 0.005-0.5 | 0.1-1.5 | 0.001-0.1 | 0.00-0.1 |
| Ni | 0.005-0.01 | 0.001-0.01 | 0.00-0.01 | | |
| Sr | 0.001-0.05 | 0.001-0.03 | 0.001-0.025 | 0.000-0.002 | 0.005-0.05 |
| Na | 0.001-0.05 | 0.001-0.03 | 0.001-0.025 | 0.000-0.002 | 0.005-0.05 |
| Ca | 0.001-0.05 | 0.001-0.03 | 0.001-0.025 | 0.000-0.002 | 0.005-0.05 |

It is to be understood that in some variations of the embodiments of the cladding alloys described above, in the text and in the tables, including the first through the twentieth exemplary embodiments, the remainder of the cladding alloy composition is Al and unavoidable impurities. For example (which may apply to each of the embodiments), a twentieth embodiment can be an aluminum alloy cladding contains 0.1-1 wt % Cu, 0.2-0.4 wt % Fe, 0.35-1 wt % Mn, 7-12 wt % Si, 0.01-0.15 wt % Ti and 3.25-7 wt % Zn, remainder Al. However, in some other variations, even if an embodiment is described as having "remainder Al," the embodiments of the cladding alloys described above can comprise further constituents, as in the exemplary variations discussed below.

In the first variation of the first through twentieth embodiments, the cladding alloy optionally contains 0.001-0.3 wt % Mg. In the second variation of the first through twentieth embodiments, the cladding alloy optionally contains 0.005-0.5 wt % Mg. In the third variation of the first through twentieth embodiments, the cladding alloy optionally contains 0.1-1.5 wt % Mg. In the fourth variation of the first through twentieth embodiments, the cladding alloy optionally contains 0.00-0.1 wt % Mg. In the fifth variation of the first through twentieth embodiments, the cladding alloy optionally contains 0.00-0.01 wt % Ni. In the sixth variation of the first through twentieth embodiments, the cladding alloy optionally contains 0.001-0.01 wt % Ni. In the seventh variation of the first through twentieth embodiments, the cladding alloy optionally contains 0.005-0.001 wt % Ni. In the eighth variation of the first through twentieth embodiments, the cladding alloy optionally contains 0.001-0.05 wt % of at least one Sr, Na or Ca. In the ninth variation of the first through twentieth embodiments, the cladding alloy optionally contains 0.001-0.03 wt % of at least one of Sr, Na or Ca. In the tenth variation of the first through twentieth embodiments, the cladding alloy optionally contains 0.001-0.025 wt % of at least one of Sr, Na or Ca. In the eleventh variation of the first through twentieth embodiments, the cladding alloy optionally contains 0.000-0.002 wt % of at least one of Sr, Na or Ca. In the twelfth variation of the first through twentieth embodiments, the cladding alloy optionally contains 0.01-0.025 wt % of at least one of Sr, Na or Ca. In the thirteenth variation of the first through twentieth embodiments, the cladding alloy optionally contains 0.005-0.05 wt % of at least one of Sr, Na or Ca. In the fourteenth variation of the first through twentieth embodiments, the cladding alloy optionally contains 0.001-0.05 wt % of Sr. In the fifteenth variation of the first through twentieth embodiments, the cladding alloy optionally contains 0.001-0.03 wt % of Sr. In the sixteenth variation of the first through twentieth embodiments, the cladding alloy optionally contains 0.001-0.025 wt % of Sr. In the seventeenth variation of the first through twentieth embodiments, the cladding alloy optionally contains 0.000-0.002 wt % of Sr. In the eighteenth variation of the first through twentieth embodiments, the cladding alloy optionally contains 0.01-0.025 wt % of Sr. In the nineteenth variation of the first through twentieth embodiments, the cladding alloy optionally contains 0.005-0.05 wt % of Sr.

It is to be understood that the above-described variations of the embodiments may apply not only to the above embodiments, but also to other embodiments of the aluminum alloy cladding. Further, it is to be understood that each of the variations may be employed separately or in a suitable combination with other variations. That is, the embodiments of the aluminum alloy cladding may contain variations of one or more of Mg content, Ni content, Sr content, Na content, or Ca content. As an illustration, an aluminum alloy cladding may contain 0.1-1.0 wt % Cu, 0.1-0.5 wt % Fe, 0.1-1.0 wt % Mn, 3-15 wt % Si, 0.005-0.15 wt % Ti, and 0.1-7 wt % Zn and 0.001-0.3 wt % Mg, remainder Al. The remainder of the aluminum alloy cladding may be aluminum and normal impurities or other constituents may also be present in the cladding alloy. For example, the cladding alloy may contain, in addition to the above-specified elements, 0.001-0.01 wt % Ni and/or 0.001-0.005% Sr. In another example, an aluminum alloy cladding contains 0.2-0.3 wt % Cu, 0.2-0.3 wt % Fe, ≤0.1 wt % Mg, ≤0.6 wt % Mn, 0.005-0.01 wt % Ni, 7-12 wt % Si, 0.05-0.15 wt % Ti, 0-3.5 wt % Zn and 0.01-0.025 wt % Sr, remainder Al. It is to be understood that other constituents may also be present in the cladding alloy.

In some cases, the aluminum alloy cladding according to the embodiments of the present invention may be specified using only the upper limits for the content of the constituent element. In an illustrative example, the aluminum alloy cladding is described as containing ≤1.0 wt % Cu, ≤0.5 wt % Fe, ≤1.5 wt % Mg, ≤1.0 wt % Mn, ≤0.01 wt % Ni, ≤15 wt % Si, ≤0.15 wt % Ti, ≤7 wt % Zn, remainder Al. In another illustrative example, a aluminum alloy cladding contains ≤1.0 wt % Cu, ≤0.5 wt % Fe, ≤0.2 wt % Mg, ≤1.0 wt % Mn, ≤0.01 wt % Ni, ≤15 wt % Si, ≤0.15 wt % Ti, ≤7 wt % Zn and ≤0.05 wt % Sr, remainder Al. In one more example, a aluminum alloy cladding is described as containing ≤1.0 wt % Cu, ≤0.5 wt % Fe, ≤0.2 wt % Mg, ≤1.0 wt % Mn, ≤0.051 wt % Ni, ≤15 wt % Si, ≤0.15 wt % Ti, ≤7 wt % Zn and ≤0.05 wt % of at least one of Sr, Na or Ca, remainder Al. In the above illustrative examples, the lower limit of the constituent element content may or may not be 0, 0.00, or 0.000 wt %, depending on the specific element.

It is to be understood that the above examples of ranges are non-limiting. In some cases, the above elements may be present in the amounts falling outside of the above ranges, or may not be present. It is to be understood that the element is designated as "not present" or "absent" or when the content of the element is described as "0 wt %," "0.00 wt %," "0.000 wt %", the element in question may not be present, may not be present in detectable quantities, or may be present in such low quantities that they are conventionally not recognized as meaningful in the field of aluminum alloys. It is also to be understood that, in some cases, an element may be not specified in the description of an alloy. It is to be understood that, in such cases, the element may be present in various amounts or not be present.

Clad aluminum alloys described herein contain a core aluminum alloy. A core aluminum alloy can be any 3xxx or 6xxx series alloy that can be brazed without undue melting or dissolution due to its inherent melting range. Core aluminum alloys can be the alloys commonly described as "Long Life," meaning that they use a mechanism to slow down the corrosion through the core. One example of such mechanism is described in U.S. Pat. Nos. 5,041,343 and 5,037,707. As discussed in these patents, a dense precipitate band forms during the braze cycle in the core adjacent to the interface between the core alloy and the cladding alloy. This dense precipitate band is sacrificial to the core during corrosion, thereby slowing down the corrosion of the core. The presence and the content of one or more elements other than aluminum in the core aluminum alloy can affect properties of the core aluminum alloy according to the general principles known in the field of metallurgy and briefly summarized earlier in this document. It is therefore possible to change the properties of the core and of the clad aluminum alloy that incorporates the core by varying the presence and the content of one or more of the elements, some of which are discussed below. The core aluminum alloy of the clad aluminum alloys according to the embodiments of the present invention can comprise in some non-limiting examples 0.0-0.7, 0.05-0.7 or 0.1-0.4 wt % Fe. The presence of Fe in the core aluminum alloy is optional, and Fe content may be characterized as an impurity in some cases. The core aluminum alloy of the clad aluminum alloys according to the embodiments of the present invention can comprise in some non-limiting examples 0.005-07, 0.1-0.8 or 0.4-0.7 wt % Cu. The core aluminum alloy of the clad aluminum alloys according to the embodiments of the present invention can comprise in some non-limiting examples 0.3-1.5, 0.5-1.8 or 1.2-1.6 wt % Mn. The core aluminum alloy of the clad aluminum alloys according to the embodiments of the present invention can comprise in some non-limiting examples 0.001-0.2, 0.1-0.15 or 0.13-0.3 wt % Ti. The presence of Zn in the core is optional. The core aluminum alloy of the clad aluminum alloys according to the embodiments of the present invention can comprise in some non-limiting examples 0.00-2.0, 0.00-1.0, 0.001-2.0 or 0.001-1.0 wt % Zn. The presence of Mg in the core is optional. The core aluminum alloy of the clad aluminum alloys according to the embodiments of the present invention can comprise in some non-limiting examples 0.0-1.5 wt % Mg or 0.001-1.5 wt % Mg. Examples of core aluminum alloys are described, for example, in U.S. Pat. No. 4,649,087. In one exemplary embodiment, a core aluminum alloy contains 0.005-0.7 wt % Cu, 0.0 to 0.7 wt % Fe, 0.3-1.5% wt % Mn, 0.0-1.5 wt % Mg, 0.13-0.3 wt % Ti, and 0.0-0.8% Si, remainder Al.

Properties and Advantages

Conventionally, the cladding in the clad aluminum alloys used for brazing applications is produced from commercial purity smelter aluminum, to which Si is added. Conventional brazing cladding typically contains between 7 and 12% Si, and ≤0.25% Fe. Mg can be present if the alloy is to be used in vacuum brazing applications. Other elements are typically present in such conventional cladding alloys at trace levels, such as ≤0.05 wt % or less than 0.005 wt %. Commercial purity smelter metal, which is required for production of the above conventional cladding alloys due to their high purity, is more expensive than secondary or recycled metal.

Wrought aluminum alloys are not used as cladding alloys for brazing applications because they are possibly considered to be inferior in quality and consistency. Generally, a limited number of brazing cladding alloys is traditionally used in the field of aluminum metallurgy and in the related fields. For example, for inert atmosphere brazing, alloys like AA4343, 4045 and 4047 are the mostly commonly used cladding alloys. Conventional brazing cladding alloys have a relatively well known and defined melting range, as they primarily include Al, Si and possibly Zn or Mg. The phase diagrams determined the choice of the alloys suitable for brazing in the aluminum industry. Refer, for example, to "Multicomponent Phase Diagrams: Applications for Commercial Aluminum Alloys" Elsevier, 2005, ISBN 0-080-44537-3.

Surprisingly, the present invention reveals that wrought aluminum alloys can be advantageously recycled and used as a cladding alloy in clad aluminum alloys for brazing applications. Wrought aluminum alloys can also be advantageously combined with conventional high purity smelter metal and used as cladding alloy in clad aluminum alloys for brazing applications. Thus, the embodiments of the present invention incorporate a cladding alloy that can be derived from a mixture of smelter grade aluminum with the addition of various clean aluminum alloy scrap. A brazing cladding alloy incorporated into the embodiments of the present invention can also be produced from clean scrap aluminum, to which Si is added to produce an alloy with the desired melting range. The cladding alloys described herein have one or more other advantages over conventional cladding alloys, particularly when used in fabricating sheet materials for brazing-compatible applications.

The present invention allows for recycling of wrought aluminum that commercial rolling and casting facilities produce. The term "recycling" and related terms are used herein to describe a notion that previously fabricated aluminum alloys or objects prepared from such alloys can be combined and treated by metallurgical processes to fabricate commercially and technologically useful aluminum alloys, which can be characterized as "recycled." Cladding brazing alloys incorporated into the embodiments of the present invention can contain up to 100% or recycled aluminum, or "scrap." In some cases, the only additional element to be added to scrap aluminum to produce the recycled cladding alloys is Si in order to achieve Si content required for the desired melting range, such as 7.5% Si or 10% Si. In some other cases, other additional elements may be added.

Using recycled wrought aluminum as a component of cladding alloys can reduce the cost of the innovative clad sheet aluminum alloys for brazing applications. The following example is included to illustrate this point. If a price of $1,500 per ton is set for smelter grade aluminum, then scrap aluminum is likely to sell for approximately half of the above price. When clad sheet aluminum alloys are made commercially, scrap is generated by trimming and discarding various portions of an ingot, hot rolled slab, or cold rolled material. This scrap, after re-melting, is a mixture of both cladding and core. If the cladding is fabricated from smelter grade aluminum plus Si, and the core is a high Mn, Cu alloy, then the scrap has a composition somewhere in between the cladding and the core alloys, depending on the overall original cladding thickness and at what point in the processing the material was scrapped. The cladding alloys employed in the clad aluminum alloys according to the embodiments of the present invention can be prepared from such scrap after the addition of Si, with the resulting price in the above hypothetical situation being lower than the smelter grade aluminum (for example, approximately 10, 20, 30, or 40% lower).

An advantage of the cladding alloys incorporated into the embodiments of the present invention is that the fillets or residual cladding produced post-brazing can resist corrosion better than the fillets or the residual cladding produced by conventional cladding alloys. The improved corrosion resistance is due to the presence of additional elements in the cladding alloys used in the clad aluminum alloys of the present invention, in comparison to conventional cladding alloys. Two examples of such additional elements that can beneficially affect the corrosion properties of the fillets and the residual cladding, which can act as protective anti-corrosion coating in the parts and objects subjected to brazing, are Cu and Mn. Cu and/or Mn, when present in solid solution in an aluminum alloy, raise the corrosion potential of alpha Al. This reduces the spread between the Si particles, which are very cathodic, and alpha Al. The increased corrosion resistance is based on the known principles, some of which are illustrated in the corrosion diagram reproduced in FIG. 3. For example, if one considers that relatively pure Si has ASTM G69 open coupled corrosion potential (sce) of −170 mv, and alpha Al without Cu has open coupled corrosion potential in the range −760 to −740 mv, then adding 0.1 wt %. Cu to the Alpha Al would make it more cathodic by about 50 mv. Adding 1 wt % Mn to alpha Al would move the corrosion potential further in the cathodic direction, thus closing the gap between the matrix and the Si particles. Elements other than Mg can move the potential even further when present in the cladding alloy, in accordance with the known electrochemical principles.

The improved cladding alloys incorporated into the clad sheet aluminum alloys described herein are stronger than conventional cladding alloys due to the presence of one or more of the metals in addition to aluminum, as illustrated in Table 1. One or more additional elements can be present in solid solution and/or in constituent form. Two examples of such additional elements that affect the strength of the fillets are Cu and Mn. Common brazing cladding alloys, which are made from substantially pure Al with addition to Si, are relatively soft in comparison to the cladding alloys incorporated into the embodiments of the present invention. Table 2 shows tensile properties of a selection of conventional cladding aluminum alloys (4043-0, 4343, 4045-0 and 4047) and of exemplary casting aluminum alloys (A413.0-F, A356 and A360.0-F), thus illustrating the compositions and properties that can be advantageously incorporated into embodiments of the present invention.

The increased strength of the cladding alloys incorporated in the embodiments of the present invention minimizes the loss of cladding by squeeze out on the edges of packages during the rolling processes typically employed in the fabrication of clad sheet alloys. Cladding alloys used in the embodiments of the present invention also resist spreading during hot rolling and allow for larger reductions per pass, which, in some cases, helps to reduce the spread in cladding thickness between edge and center, a common disadvantage of conventional clad sheet alloys. The cladding alloys incorporated into the clad sheet alloys according to the embodiments of the present invention can ensure more consistent cladding thickness across the width of the clad sheet.

The strength data on 4343 and 4045 alloys shown in Table 2 was experimentally obtained. Other strength data shown in Table 2 were obtained from MatWeb material property data website in the non-ferrous section, under aluminum alloys. The strengths of casting alloys shown in Table 2 were measured at room temperature. When subjected to higher temperatures, Al alloys become softer. As an example AA1100 tested at room temperature has ultimate tensile strength (UTS) of 90 MPa, while AA1100 tested at 371° C. has UTS of 14.5 MPa. AA3003 has UTS of approximately 110 MPa at room temperature, but UTS of 19 MPa at 371° C. It is therefore to be understood that Table 2 serves as illustration of room temperature strength properties of cladding aluminum alloys. Strength properties, such as UTS, can be reduced by as much as 85-95% at hot rolling temperatures, in comparison to the same properties measured at room temperature. The tensile data at different temperature is shown in the materials published by the Aluminum Association, namely, Aluminum Standards and Data 1997, for example, pages 2-5, 2-7 and 2-9.

Figure 4:
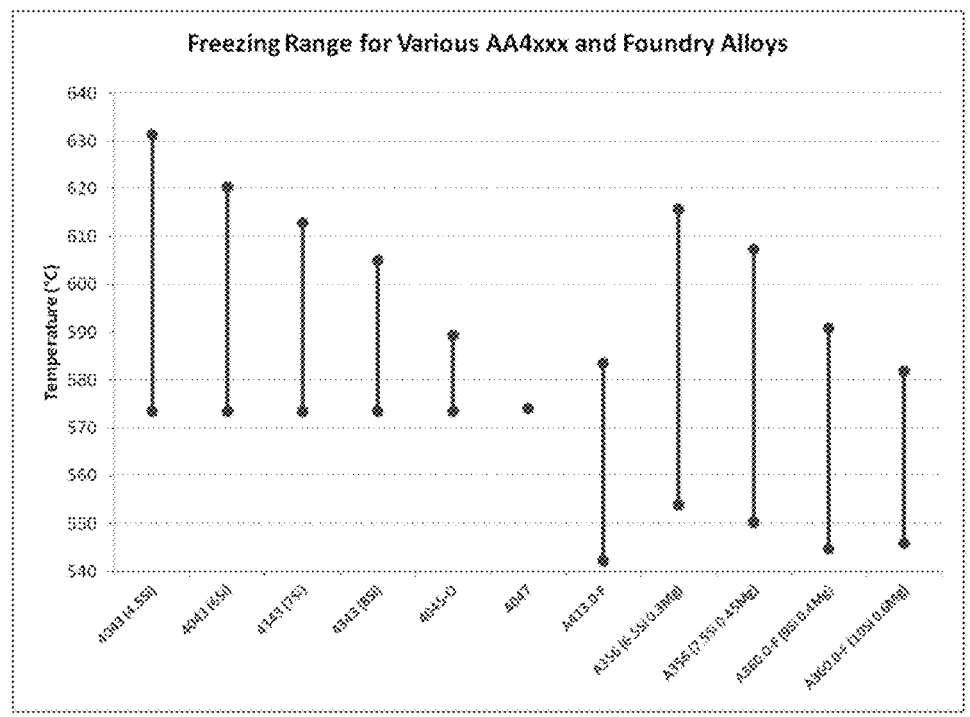
FIG. 4 is a bar plot illustrating the results of a ThermoCalc calculation of melting temperatures of a range of aluminum alloys.

Yet one more advantage of the aluminum alloys incorporated into the aluminum alloy cladding of clad aluminum alloys described herein is that they can melt at lower temperature during a brazing or similar process, as compared to conventional brazing cladding. This offers a cost benefit in the manufacture of brazed components and/or parts due, for example, to reduced energy expenditures. To illustrate reduced melting temperatures, Table 3 and the bar graph shown in FIG. 4 were generated by ThermoCalc software (Thermo-Calc Software, Inc, McMurray Pa.) and show that aluminum alloys containing additional elements melt at significantly reduced temperature than aluminum alloys with similar Si content but lower levels of one or more additional elements. For example alloy 4343 at 7 wt % Si melts in a temperature range from 573.5° C. (solidus, meaning the temperature at which the metal starts to melt) to 612.8° C. (liquidus, meaning the temperature at which the material is fully molten). In comparison, a casting alloy, such as A356 containing a similar level of Si, melts in a temperature range from 550° C. (solidus) to 607° C. (liquidus).

The following examples are included to illustrate the properties and advantages discussed above. In one example, tube stock for radiators is commonly composed of a core alloy which is clad between 3% and 18% in relation to full thickness on one side with an Al—Si alloy (AA4343, AA4045+/−Zn) and possibly also with a liner alloy on the opposite side. In another example, evaporator plates can be made from AA4343 alloy each clad 5% to 15% on both sides of a core alloy. Both of the above clad alloys can be advantageously produced with the cladding described herein. Generally, the requirements for cladding alloy is to melt and flow at the manufacturer's required brazing temperature and to offer a certain required strength post braze, so that the brazed part or object can withstand various testing conditions demonstrating compliance with the service requirements, such as burst pressure, cyclic fatigue, corrosion resistance, etc. Having a brazing alloy that can melt and flow at a lower temperature lowers the costs of brazing processes, as they can be conducted at lower brazing temperatures. A stronger

TABLE 2

Tensile properties of exemplary aluminum alloys.

| Alloy | Si wt % | Cu wt % | Fe wt % | Mg wt % | Mn wt % | Ni wt % | Zn wt % | Ti wt % | YS* (MPa) | UTS** (MPa) |
|---|---|---|---|---|---|---|---|---|---|---|
| 4043-0 | 4.5-6.0 | Trace | Trace | Trace | Trace | Trace | Trace | Trace | 70 | 145 |
| 4343 | 7.0-8.0 | Trace | Trace | Trace | Trace | Trace | Trace | Trace | | |
| 4045 - O | 10 | Trace | Trace | Trace | Trace | Trace | Trace | Trace | 57 | 115 |
| 4047 | 12 | Trace | Trace | Trace | Trace | Trace | Trace | Trace | 65 | 140 |
| A413.0-F | 11-13 | ≤1.0 | ≤1.30 | ≤0.10 | ≤0.35 | ≤0.15 | ≤0.50 | ≤0.050 | 131 | 290 |
| A356 | 6.50-7.50 | ≤0.20 | ≤0.15 | 0.30-0.45 | ≤0.10 | <0.050 | ≤0.10 | 0.20 | | 131-145 |
| A360.0-F | 9.0-10.0 | ≤0.60 | ≤2.0 | 0.40-0.60 | ≤0.35 | ≤0.50 | ≤0.50 | ≤0.050 | 170 | 300 |

*YS = yield strength;
**UTS = ultimate tensile strength

TABLE 3

Calculated melting range for various aluminum alloys

| | ALLOY | | | | | | | | | | |
|---|---|---|---|---|---|---|---|---|---|---|---|
| | 4043 | 4343 | | 4047 | | A413.0-F | | | A356 | | A360.0-F |
| | | | | | | Si and Mg levels (wt %) | | | | | |
| | 4.5 Si | 6 Si | 7 Si | 8 Si | 11 Si | 13 Si | 6.5 Si 0.3 Mg | 7.5 Si 0.45 Mg | 9 Si 0.4 Mg | Variant 1* | Variant 2* | Variant 3* | 10 Si 0.6 Mg |
| Liquidus (K) | 904.2 | 893.3 | 885.8 | 878.1 | 847.1 | 856.6 | 888.7 | 880.4 | 863.8 | 879.9 | 876.1 | 875.5 | 854.9 |
| Liquidus (° C.) | 631.2 | 620.3 | 612.8 | 605.1 | 574.1 | 583.6 | 615.7 | 607.4 | 590.8 | 606.9 | 603.1 | 602.5 | 581.9 |
| Solidus (K) | 846.5 | 846.5 | 846.5 | 846.5 | 846.5 | 815.2 | 826.9 | 823.3 | 817.7 | 836.9 | 832.1 | 830.7 | 818.8 |
| Solidus (° C.) | 573.5 | 573.5 | 573.5 | 573.5 | 573.5 | 572.2 | 553.9 | 550.3 | 544.7 | 563.9 | 559.1 | 557.7 | 545.8 |

* Please refer to Table 4 for compositions of "Variant 1," "Variant 3" and "Variant 4" of A356 alloy and less corrosion-prone cladding alloy can advantageously improve the properties of the objects fabricated from such an alloy, such as a radiator or an evaporator.

Processes

Figure 5:
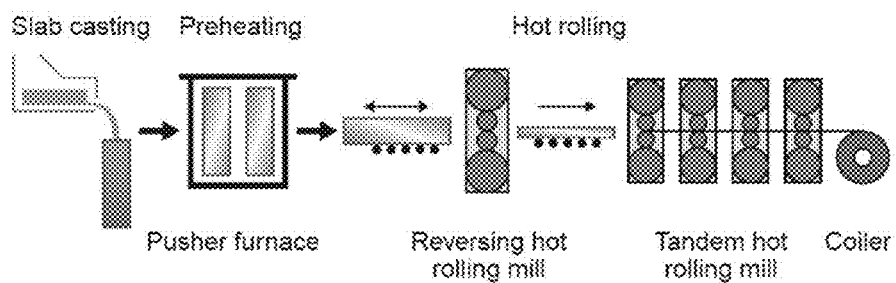
FIG. 5 is a scheme illustrating a generic casting/hot rolling process suitable for production of sheet aluminum alloys. Reproduced with permission from NSW HSC Online © NSW Department of Education and Communities, and Charles Sturt University, 2011.
Figure 6:
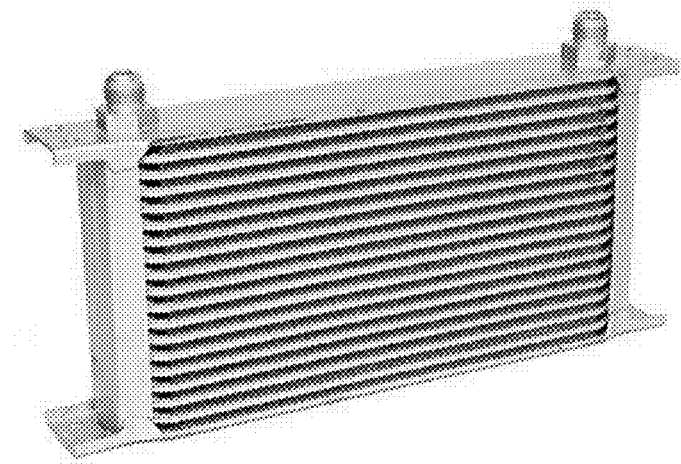
FIG. 6 is photograph of an example of an oil cooler.
Figure 7:
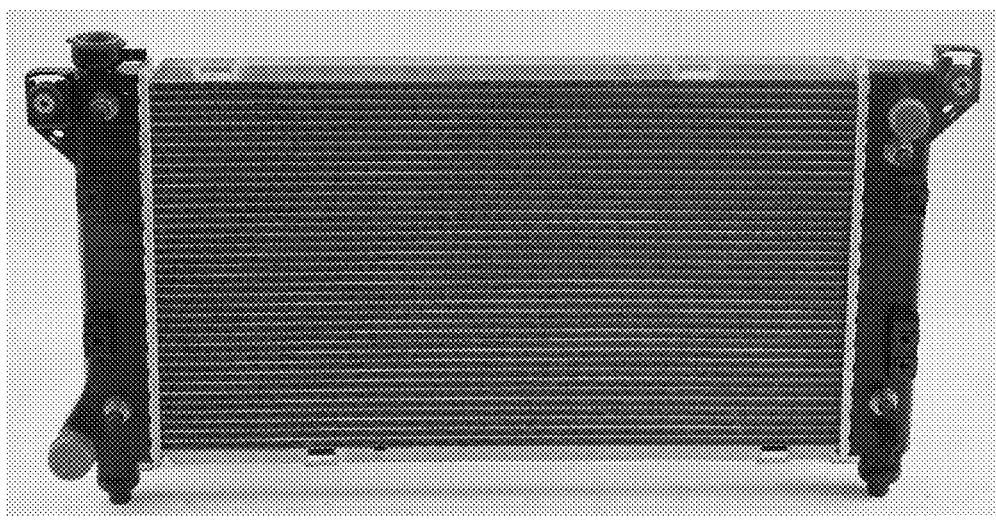
FIG. 7 is a photograph of an example of a radiator.
Figure 8:
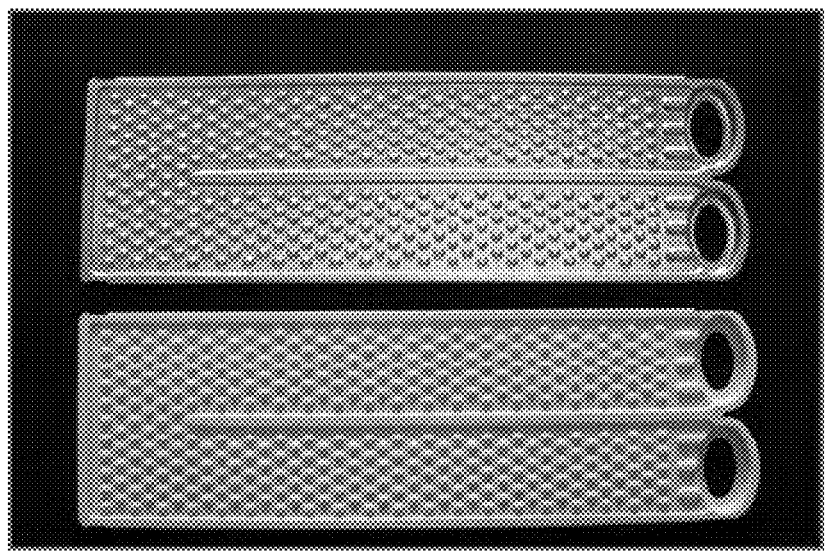
FIG. 8 is a photograph of an example of evaporator plates.
Figure 9:
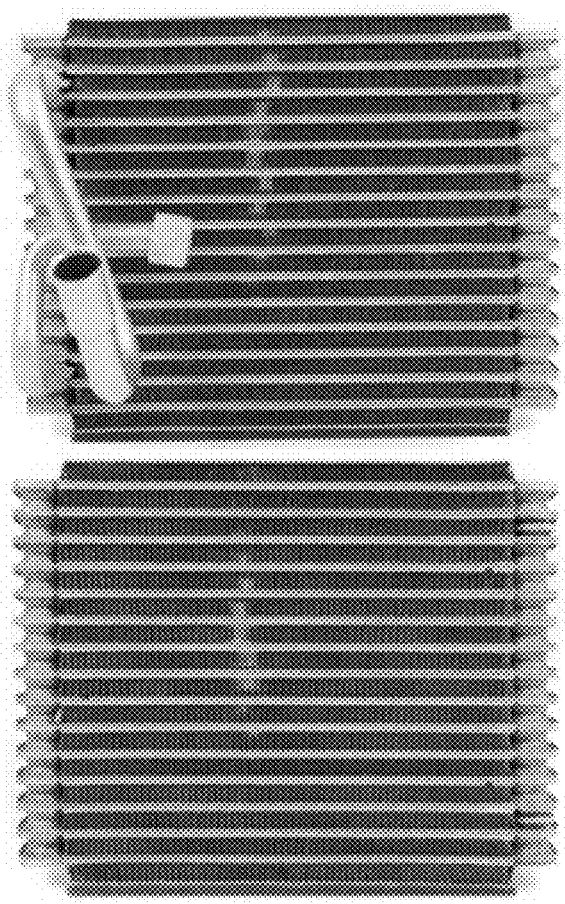
FIG. 9 is a photograph of an example of an evaporator.
Figure 10:
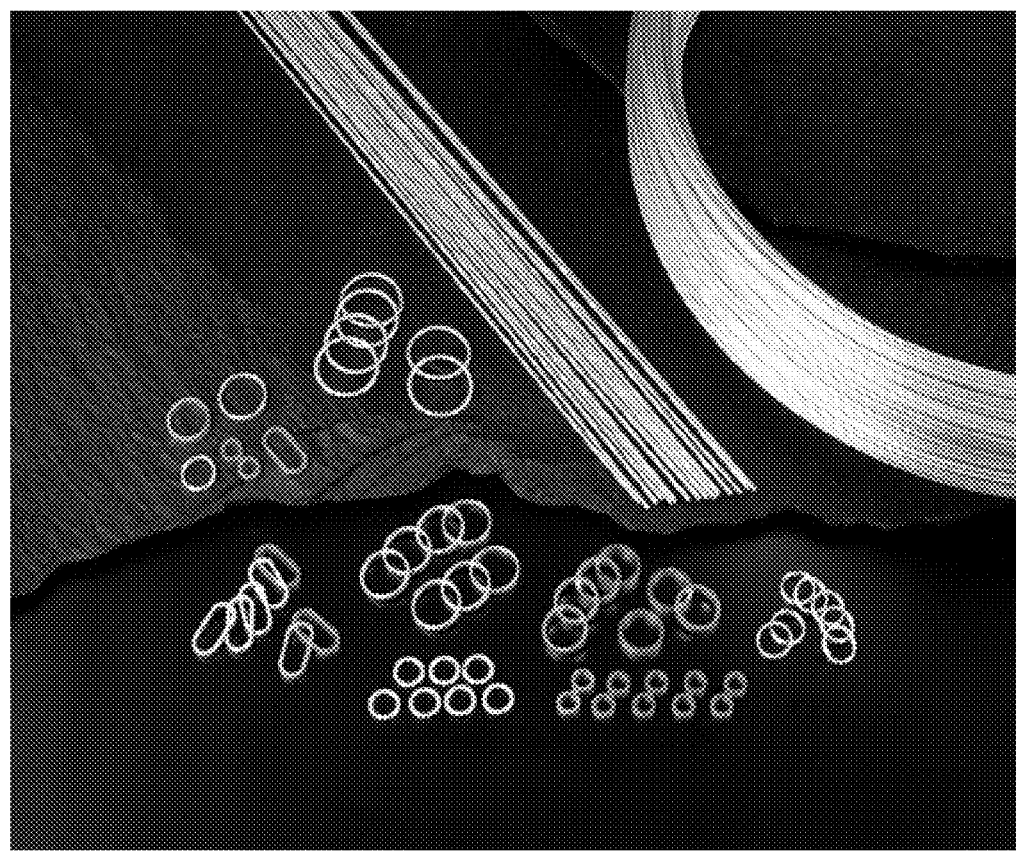
FIG. 10 is a photograph showing rings of varying sizes, wires, coil of wire and other shapes that can be used as filler during braze of not clad components.

The processes for making or fabricating the clad aluminum alloys described herein, as well as for fabricating the objects using the clad aluminum alloys are also included within the scope of the present invention. One exemplary process is schematically illustrated in FIG. 5. Clad aluminum described herein can be fabricated by the processes that include at least some of the technological steps described and shown in this document. It is to be understood that descriptions and illustrations of the processes contained in this document are non-limiting. The process steps described herein can be combined and modified in various ways and suitably employed for fabricating the clad aluminum alloys or forms and objects from such alloys. Process steps and conditions that are not explicitly described herein, yet commonly employed in the areas of metallurgy and aluminum processing and fabrication, can also be incorporated into the processes falling within the scope of the present invention.

One technology that can be suitably incorporated into the processes according to the embodiments of the present invention is "fusion casting," which can be also referred to by the trade name FUSION™ (Novelis, Atlanta, US), and is described, for example, in U.S. Pat. No. 7,472,740. Generally, fusion casting is a process of casting of a composite or multilayer metal ingot. When casting by the FUSION™ (Novelis, Atlanta, US) process is employed for production of the cast aluminum alloy described herein, a cladding alloy is solidified on one or both surfaces of a partially solidified core alloy. A fusion casting process typically uses a mold with a feed end and an exit end. The molten metal is added at the feed end, and a solidified ingot is extracted from the exit end of the mold. Divider walls are used to divide the feed end into at least two separate feed chambers. The divider walls terminate above the exit end of the mold. Each feed chamber is adjacent to at least one other feed chamber. For each pair of adjacent feed chambers, a stream of a first alloy is fed to one of the pair of chambers to form a pool of metal in the first chamber. A stream of a second alloy is fed through the second of the pair of feed chambers to form a pool of metal in the second chamber. The first metal pool contacts the divider wall between the pair of chambers to cool the first pool, so as to form a self-supporting surface adjacent the divider wall. The second metal pool is then brought into contact with the first pool, so that the second pool first contacts the self-supporting surface of the first pool at a point where the temperature of the self-supporting surface is below the solidus temperature of the first alloy. The two alloy pools are joined as two layers and cooled to form a composite or multilayer ingot, which can be also referred to as "package." The multilayer ingot obtained by fusion casting is included within the scope of the clad aluminum alloys described herein.

It is to be understood that multilayer aluminum alloys can be produced by the processes other than fusion casting. For example, the cladding alloy can be cast by continuous (C.C.)

or direct chill (D.C.) casting, hot-rolled to a required thickness, and then assembled or clad onto one or both sides of a core alloy by hot roll bonding. Thus produced "hot rolled band" can be cold rolled to an intermediate gauge and annealed or cold rolled in a number of passes to a final gauge.

Hot rolling can be suitably incorporated into the processes according to the embodiments of the present invention. For example, packages or ingots, produced by the direct chill or FUSION™ process, are reheated to a temperature between 450° C. and 550° C. and hot rolled to an intermediate gauge of 2 to 10 mm. Reheating can take place in a pusher furnace over a 5 to 10 h period or in a pit furnace over a 15 to 24 h period. The pre-heating process can be optionally incorporated into the process of the present invention.

Cold rolling can also be suitably incorporated into the processes according to the embodiments of the present invention. Depending on the hot rolling final gauge, a cast aluminum alloy may require more or fewer cold rolling passes. For example, cold rolling can involve 1 to 6 cold rolling passes, depending on the hot band gauge supplied from the hot mill. This number of cold passes is not limited and can be suitably adjusted, for example, depending on the desirable thickness of the final sheet. A thickness achieved by cold rolling can be from 50 microns to 1 mm. Some examples of thicknesses achieved by cold rolling are 50 microns (typically used for fin materials) and 200 microns, and 1 mm for tube stock components.

Annealing can also be incorporated into the processes according to the embodiments of the present invention. For example, a clad sheet aluminum alloy can be partially or fully annealed to achieve suitable formability requirements.

Clad sheet aluminum alloys are suitable for brazing applications. Accordingly, various brazing processes and technological steps can be suitably employed in the embodiments of the present invention. Brazing of aluminum parts is generally described in U.S. Pat. No. 3,970,327. Brazing includes salt brazing, CAB brazing, vacuum brazing and Ni-plated brazing. Brazing of a clad sheet aluminum alloy requires a cladding alloy that melts at a temperature significantly lower than the core alloy. Standard commercial Al—Si cladding alloys used for brazing applications usually start to melt at about 575° C.-577° C. and are fully liquid at the temperatures between 577° C. and 615° C., depending on the Si content. The core typically melts at 645° C. and above. The clad aluminum alloys of the present invention behave in accordance with the above requirements.

Furthermore, because of the additional elements present in the cladding layer, clad aluminum alloys described herein may advantageously have a lower melting point of the cladding than conventional clad aluminum alloys used for brazing applications. For example, ThermoCalc simulations showed that the cladding incorporated into the clad sheet alloys of the present invention can melt at a significantly lower temperature than conventional aluminum alloys of the same Si content.

In one exemplary process, two forms fabricated from a clad sheet aluminum alloy are assembled, secured, optionally fluxed, if brazing is to be carried out in an inert atmosphere, and then brazed. Brazing process can be a vacuum brazing process if the core and the cladding of the clad sheet aluminum alloy contain suitable levels of Mg, usually from 0.25% to 1.5% by weight of Mg. For example, brazing can be conducted at a temperature of 600° C.-605° C.

Uses and Applications

Uses and applications of the clad aluminum alloys described herein are included within the scope of the present invention, as are objects, forms, apparatuses and similar things fabricated with or comprising the clad aluminum alloys described herein. The processes for fabricating, producing or manufacturing such objects, forms, apparatuses and similar things are also included within the scope of the present invention.

One exemplary object is a heat exchanger. Heat exchangers are produced by the assembly of parts comprising tubes, plates, fins, headers, and side supports to name a few. For example, a radiator is built from tubes, fins, headers and side supports. Except for the fins, which are typically bare, meaning not clad with a Al—Si alloy, all other parts of a heat exchanger are typically clad with a brazing cladding on one or two sides. Once assembled, a heat exchanger unit is secured by banding or such device to hold the unit together through fluxing and brazing. Brazing is commonly effected by passing the unit through a tunnel furnace. Brazing can also be performed by dipping in molten salt or in a batch or semi-batch process. The unit is heated to a brazing temperature between 590° C. and 610° C., soaked at an appropriate temperature until joints are created by capillary action and then cooled below the solidus of the filler metal. Heating rate is dependent on the furnace type and the size of the heat exchanger produced.

Some other exemplary objects that can be made with the alloys of the present invention are described and shown in U.S. Pat. No. 8,349,470. Some examples of such objects are an evaporator plate, an evaporator, a radiator, a heater, a heater core, a condenser, condenser tubes, various tubes and pipes, a manifold, and some structural features, such as side supports. The uses of the cladding brazing aluminum alloys according to the present invention are not limited to the processes that involve brazing cladding alloys onto core alloys or interlayer alloys. For example, cladding brazing aluminum alloys can be produced for filler rings made from drawn wire. In another example, a cladding brazing aluminum alloy produced in sheet form can be used as filler shim. The shim material can have a thickness anywhere from a few microns to a millimeter, depending on the application. Some of the above embodiments are illustrated in FIGS. 6-11.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

Example 1

Three variants of a casting alloy similar to A356 were produced and clad on X902 or X912 cores. X902 is an alloy containing nominal 1.4-1.6 Mn, 0.5-0.65 Cu, ≤0.15 Si, ≤0.02 Mg, ≤0.015 Ti, all in wt %. X912 is an alloy having X902 base with 0.1 wt % Ti addition. Four conventional cladding alloys of 4343 series clad on X902 and X912 core were used as controls. Clad sheet alloys were processed to 0.3 and 0.25 mm and then exposed to a braze cycle to confirm the cladding alloys would melt and flow. ThermoCalc analysis was performed to check melting range and types of constituents. The alloys tested are characterized in Tables 3 and 4.

TABLE 4

Composition of the cladding alloys (wt %).

| ALLOY | Cu | Fe | Mg | Mn | Ni | Si | Ti | Zn | Sr |
|---|---|---|---|---|---|---|---|---|---|
| 4343 1 Zn | 0.0016 | 0.18 | 0.0008 | 0.0034 | 0.0083 | 7.34 | 0.0075 | 0.97 | 0.0139 |
| 4343 2 Zn | 0.0015 | 0.19 | 0.0008 | 0.0033 | 0.0087 | 7.39 | 0.0076 | 2.08 | 0.0138 |
| 4343 5 Zn | 0.0016 | 0.22 | 0.0009 | 0.0036 | 0.0095 | 7.35 | 0.0072 | 5.01 | 0.0132 |
| 4343 7 Zn | 0.0017 | 0.23 | 0.0009 | 0.0038 | 0.0101 | 7.17 | 0.0071 | 6.93 | 0.0119 |
| ~A356 Variant 1 1% Zn | 0.22 | 0.20 | 0.075 | 0.35 | 0.009 | 7.44 | 0.050 | 1.01 | 0.0002 |
| ~A356 Variant 2 3% Zn | 0.22 | 0.23 | 0.072 | 0.36 | 0.010 | 7.38 | 0.047 | 2.93 | 0.0002 |
| ~A356 Variant 3 3% Zn Cu, Mn | 0.30 | 0.21 | 0.064 | 0.44 | 0.009 | 7.41 | 0.041 | 2.96 | 0.0002 |

Example 2

Behavior of the Clad Sheet Aluminum Alloy Under Brazing Conditions

Figure 12:
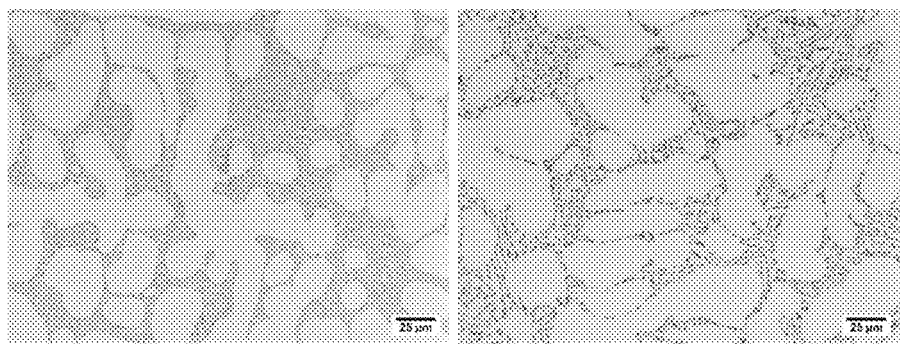
FIG. 12 is a micrograph illustrating a comparison of two experimental cladding aluminum alloys in the "as cast" condition. Panel A shows a longitudinal section through an "as cast" ingot of a conventional aluminum alloy AA4343+ 1% Zn modified with Sr. Panel B shows a longitudinal section through an "as cast" ingot of a cladding aluminum alloy according to an embodiment of the present invention.

An investigation of the behavior of the clad sheet aluminum alloy under brazing conditions was conducted. "Variant 2" cladding alloy (Table 4) was tested. A conventional aluminum alloy AA4343+1 Zn modified with Sr and clad on a X902 core alloy was used as a control. FIG. 12 shows the microstructures of the "as cast" alloys being tested. Notably, "variant 2" alloy did not contain Sr, which is used to modify the Si particles in the as cast ingot from needle shape to fine spherical shape. As seen in panel B, "as cast" "variant 2" alloy contained larger Si particles due to the absence of Sr. Inclusion of Sr is not a requirement for a cladding alloy to be suitable for brazing applications. However, further testing of commercial size casting of ingots is envisioned to ascertain whether Sr or Na additions are desirable for commercial casting.

Figure 13:
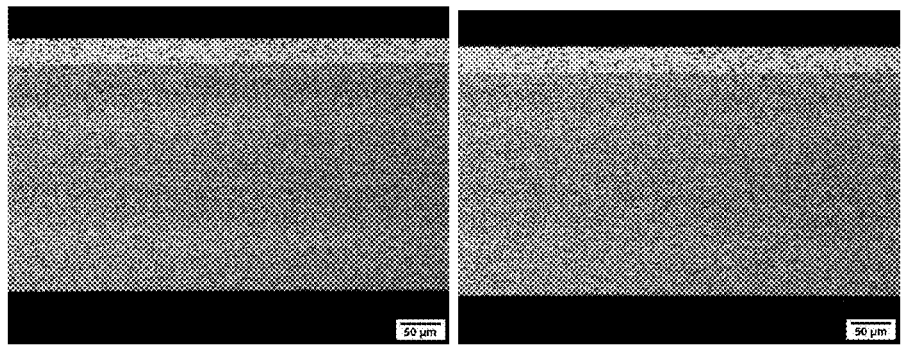
FIG. 13 is a micrograph illustrating the comparison of the brazing sheets produced from each cladding alloy shown in FIG. 12. Panel A shows a longitudinal section of a clad sheet alloy in which conventional aluminum alloy AA4343+1% Zn modified with Sr is clad onto one side of X902 core alloy. Panel B shows a longitudinal section of variant 2 cladding alloy clad onto X902 core alloy.

A comparison of the brazing sheets produced from each cladding alloy is shown in FIG. 13. Panel A of FIG. 13 shows a longitudinal section of a control clad sheet alloy. Panel B of FIG. 13 shows a longitudinal section of variant 2 casting alloy. The micrographs shown in FIG. 13 support a conclusion that the variant casting alloy exhibits a microstructure similar to that of a standard cladding alloy. Although "variant 2" alloy did not contain Sr to modify the Si particles, the resulting microstructure was still relatively fine and well dispersed. The ingots used in the experiment were direct chill cast in a small ingot 3.75×9×24 inches. The solidification rate was higher than that typically observed in a commercial ingot, which may be 6 feet wide by 24 inches thick by 20 feet long. However, it is envisioned that the cladding alloys according to the embodiments of the present invention will produce a microstructure suitable for brazing applications when cast in commercial ingots.

Figure 14:
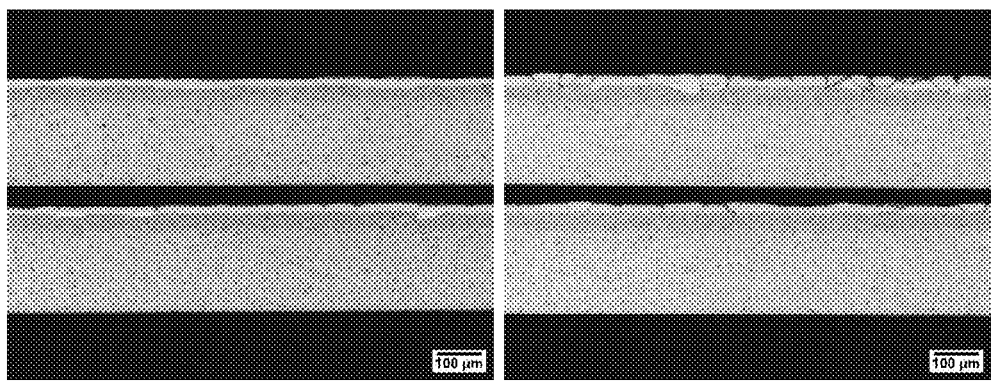
FIG. 14 is a micrograph showing post braze comparison of the samples shown in FIG. 13.

FIG. 14 is a micrograph showing post braze comparison of the samples shown in FIG. 13. The samples photographed for FIG. 14 were obtained by exposing the coupons of the sample clad alloys shown in FIG. 13 to 602° C.-606° C., then soaking them for 3 minutes, meaning that the temperature was "held" between 602 and 606° C. followed by cooling to 570° C. before extracting the samples from the furnace and cooling to room temperature. Coupons were produced in the laboratory and exposed to a braze cycle while in a vertical orientation. Panel A shows a micrograph of a longitudinal section of conventional AA4343+1 Zn clad. Panel B shows a micrograph of a longitudinal section of variant 2 cladding alloy clad on X902 core alloy. A longitudinal section meaning that the plane of polish is parallel to the rolling direction and the view shown in the figure is the through thickness of the sheet.

The examination of the micrographs shown in FIG. 14 revealed that that in both samples the cladding flowed similarly, and a similar level of residual filler metal was present on the surface post-brazing. In both cases, a dense precipitate band formed in the core adjacent to the residual filler surface layer. Accordingly, both the experimental alloy and the control alloy exhibited appropriate melting and flow to the bottom of a coupon when exposed in a vertical orientation. The results of the testing support a conclusion that alloys of the present invention can fill or join two components by capillary action during a braze cycle.

Example 3

Behavior of the Clad Sheet Aluminum Alloy in "Angle on Coupon" Test

Figure 15:
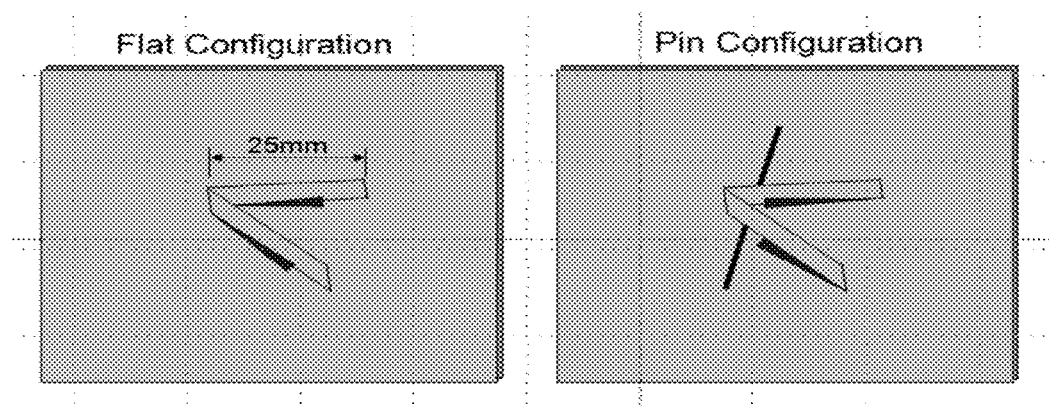
FIG. 15 is a schematic image illustrating "Angle on Coupon" testing.

A test commonly referred to as the "Angle on Coupon" test is conducted on the alloys described in the previous example. A coupon of about 1.25" square is produced from each clad sheet aluminum alloy. A small piece of bent AA1100 is placed on each coupon. The coupon and angle are fluxed by dipping in a slurry of 16% NOCOLOK™ (Solvay, Houston, US) flux in water containing a surfactant or, in the alternative, the flux is mixed in 100% isopropyl alcohol. Either fluxing method deposits about 2-6 g/m² of flux onto the surfaces of the angles and the coupons. The angles and the coupons can be lifted on one end or the other by a small wire, as illustrated in FIG. 15, thus forming a gap that can be filled by the cladding alloy during brazing. The test is used to detect the ability of the clad sheet aluminum alloys being tested to fill a gap of varying size. The length of the resulting fillet is evaluated post braze. It is observed that the filler metal fills the gaps completely up to the wire. This ability of the filler metal shows that the filler metal has the appropriate fluidity to be "pulled" by the capillary action that develops between the two surfaces.

Example 4

Corrosion Testing of Experimental Clad Sheet Alloys

All the alloys shown in Table 4 were made into clad sheet alloys and tested for corrosion resistance. Corrosion testing of experimental clad sheet alloys was conducted and showed that the cladding alloys variant 1, variant 2 and variant 3 left more residual re-solidified filler alloy on the surface of the coupons, as compared with standard alloys clad on the same core. This result indicated that the experimental cladding alloys variant 1, variant 2 and variant 3 were less anodic to the core ally than the standard cladding alloys. Accordingly, a clad sheet alloy comprising an experimental cladding, which exemplifies embodiments of the present invention, can resist corrosion at brazed joints better than the conventional alloy. Brazed objects fabricated from an experimental alloy may last longer before failure at the brazed joints due to corrosion, in comparison to the objects fabricated from conventional clad sheet alloys.

All patents, publications and abstracts cited above are incorporated herein by reference in their entirety. Different arrangements and combinations of the elements and the features described herein are possible. Similarly, some features and subcombinations are useful and may be employed without reference to other features and subcombinations. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention.

The invention claimed is:

1. An aluminum material comprising an aluminum alloy core and an aluminum alloy cladding, wherein the aluminum alloy cladding consists of 0.1-0.3 wt % Cu, 0.1-0.5 wt % Fe, 0.1-1.0 wt % Mn, 3-15 wt % Si, 0.005-0.15 wt % Ti, 0.001-0.01 wt % Ni, 3.25-7 wt % Zn, 0-1.5 wt % Mg, 0-0.05 wt % Sr, 0-0.05 wt % Na, and 0-0.05 wt % Ca, remainder Al.

2. The aluminum material of claim 1, wherein the aluminum alloy cladding consists of 0.15-0.3 wt % Cu, 0.1-0.4 wt % Fe, 0.2-0.7 wt % Mn, 5-12 wt % Si, 0.01-0.15 wt % Ti, 0.001-0.01 wt % Ni, and 3.25-7 wt % Zn, remainder Al.

3. The aluminum material of claim 1, wherein the aluminum alloy cladding consists of 0.15-0.3 wt % Cu, 0.2-0.4 wt % Fe, 0.3-0.5 wt % Mn, 7-10 wt % Si, 0.005-0.13 wt % Ti, 0.001-0.01 wt % Ni, and 3.25-7 wt % Zn, remainder Al.

4. The aluminum material of claim 1, wherein the aluminum alloy cladding consists of 0.1-0.3 wt % Cu, 0.1-0.5 wt % Fe, 0.1-1.0 wt % Mn, 3-15 wt % Si, 0.005-0.15 wt % Ti, 0.001-0.01 wt % Ni, 3.25-7 wt % Zn, and 0.005-0.05 wt % of at least one of Sr, Na or Ca, remainder Al.

5. The aluminum material of claim 1, wherein the aluminum alloy cladding consists of 0.1-0.3 wt % Cu, 0.1-0.5 wt % Fe, 0.1-1.0 wt % Mn, 3-15 wt % Si, 0.005-0.15 wt % Ti, 3.25-7 wt % Zn, 0.001-0.3 wt % Mg, and 0.001-0.01 wt % Ni, remainder Al.

6. The aluminum material of claim 1, wherein the material is in a form of a sheet comprising the aluminum alloy core and having the aluminum alloy cladding on one side of the sheet or on both sides of the sheet.

7. The aluminum material of claim 1, wherein the aluminum alloy core comprises 0.005-0.7 wt % Cu, 0.3-1.5 wt % Mn, and 0.001-0.2 wt % Ti, remainder Al.

8. A process for preparing the aluminum material of claim 1, comprising fusion casting the aluminum alloy core and the aluminum alloy cladding.

9. The process of claim 8, further comprising preparing the aluminum alloy cladding prior to casting from scrap aluminum with addition of Si or from a combination of scrap aluminum and smelter grade aluminum.

10. A process comprising joining by brazing at least one first aluminum alloy form fabricated from the aluminum material of claim 1 with a second aluminum alloy form.

11. An object fabricated by a process comprising the process of claim 10.

12. The object of claim 11, wherein the object is a heater, an evaporator plate, an evaporator, a radiator, a heater core, a condenser, a tube, a pipe or a manifold.

13. A process of joining two or more aluminum forms by brazing, wherein at least one of the two or more aluminum forms is fabricated from the aluminum material of claim 1, comprising:
    assembling and securing the two or more aluminum forms together;
    heating the two or more aluminum forms to a brazing temperature until joints are created among the two or more aluminum forms by capillary action; and,
    cooling the two or more aluminum forms below solidus of the aluminum alloy cladding.

14. The process of claim 13, wherein the brazing temperature is between 590° C. and 610° C.

15. An object fabricated by a process comprising the process of claim 13.

16. The object of claim 15, wherein the object is a heater, an evaporator plate, an evaporator, a radiator, a heater core, a condenser, a tube, a pipe or a manifold.

17. The aluminum material of claim 1, wherein the nickel content is 0.005-0.01 wt %.

18. An aluminum material comprising an aluminum alloy core and an aluminum alloy cladding, wherein the aluminum alloy cladding comprises 0.1-0.3 wt % Cu, 0.1-0.5 wt % Fe, 0.1-1.0 wt % Mn, 3-15 wt % Si, 0.005-0.15 wt % Ti, 0.001-0.01 wt % Ni, 3.25-7 wt % Zn, and 0.005-0.05 wt % of at least one of Na or Ca, remainder Al.

19. The aluminum material of claim 18, wherein the aluminum alloy cladding comprises 0.1-0.3 wt % Cu, 0.1-0.5 wt % Fe, 0.1-1.0 wt % Mn, 3-15 wt % Si, 0.005-0.15 wt % Ti, 3.25-7 wt % Zn, 0.005-0.05 wt % of at least one of Na or Ca, 0.001-0.3 wt % Mg, and 0.001-0.01 wt % Ni, remainder Al.

20. The aluminum material of claim 18, wherein the aluminum alloy cladding comprises 0.005-0.01 wt % Ni.

21. A process for preparing the aluminum material of claim 1, comprising:
    casting the aluminum alloy cladding;
    rolling the aluminum alloy cladding to a required thickness, thus producing rolled aluminum alloy cladding;
    assembling the rolled aluminum alloy cladding onto at least one side of the rolled aluminum alloy core; and,
    hot roll bonding the rolled aluminum alloy cladding onto the rolled aluminum alloy core.

* * * * *